United States Statutory Invention Registration [19]

[11] Reg. Number: H472

Peterson

[43] Published: May 3, 1988

[54] METHOD AND APPARATUS FOR PROCESSING BINARY-CODED/PACKED DECIMAL DATA

[76] Inventor: Ralph W. Peterson, 6S556 Sussex Rd., Naperville, Ill. 60540

[21] Appl. No.: 2,428

[22] Filed: Jan. 12, 1987

[51] Int. Cl.[4] ..... G06F 1/00; G05F 7/50

[52] U.S. Cl. ..... 364/200; 364/771

[56] References Cited

U.S. PATENT DOCUMENTS 3,937,941 2/1976 Zemel et al. ..... 235/159

FOREIGN PATENT DOCUMENTS 3303316 8/1983 Fed. Rep. of Germany .
2115962 9/1983 United Kingdom .

OTHER PUBLICATIONS

R. Zaks, *Programming the Z80* (Sybex, 1982) pp. 107-113, 236-237.

J. A. Otto, "Predicting Potential COBOL Performance on Low Level Machine Architectures," *SIGPLAN* Notices, vol. 20, No. 10.

R. K. Richards, *Arithmetic Operations in Digital Computers* (D. Van Nostrand Co. 1955), pp. 209-285.

G. Chroust, "Method of Adding Decimal Numbers by Means of Binary Arithmetic", *IBM Technical Disclosure Bulletin*, vol. 23, No. 10 (3-81).

D. R. Hicks et al., "Multidigit Decimal Addition and Subtraction", *IBM Technical Disclosure Bulletin, vol. 19, No. 11 (4-77).*

*Primary Examiner*—Stephen C. Buczinski

*Assistant Examiner*—Linda J. Wallace

[57] ABSTRACT

A system (FIG. 1; FIGS. 18-19) performs addition or subtraction of packed, or binary-coded-decimal (BCD), values. Each BCD digit is stored in a nibble (500) of a register (400, 401). The least-significant bits (LSBs) (502) of corresponding nibbles of the registers are exclusive-ORed and results are stored in a third register (402) (FIG. 4 or 9). For addition, the registers' binary values are summed, six is added to each nibble of the sum using binary addition, and results are stored in one register (401) (FIG. 5). For subtraction, the registers' binary values are subtracted, and the results are stored in one register (401) (FIG. 10). The LSB of each nibble of the one register is compared with the corresponding exclusive-OR value from the third register (FIG. 6 or 11). For every comparison that indicates equality for addition, and that indicates inequality for subtraction, six is subtracted using binary subtraction from the value of the one register's nibble that precedes the compared values' corresponding nibble in the registers (FIGS. 6-7 or 11-12).

52 Claims, 15 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND APPARATUS FOR PROCESSING BINARY-CODED/PACKED DECIMAL DATA

TECHNICAL FIELD

The invention is directed to the field of general purpose digital computers in general, and in particular concerns the efficient processing in such computers of data represented in binary-coded, or packed, decimal form and other non-base-2 forms.

BACKGROUND OF THE INVENTION

The COBOL programming language defines a binary coded decimal data type, which encodes each decimal digit in binary form as a separate character. The traditional decimal data type has been the "unpacked", or ASCII, form, wherein commonly eight bits are used to represent each decimal digit: four bits to hold the value of the digit, and the other four bits to hold a code identifying the character as representing a digit.

This form of the decimal data type is inefficient. It consumes eight bits to hold only a four-bit value, and hence is wasteful of memory. The large number of bits that must be moved each time a digit is moved inside a processor also adversely impacts system performance. To avoid such inefficiency, a "packed" form of the decimal data type had subsequently been developed, which discards the code-holding bits and merely retains the four value-holding bits of the "unpacked" form. The "packed" form is also known as the "binary-coded decimal", or BCD, form; "packed" is often used to refer to signed BCD, whereas BCD is typically considered to be unsigned, i.e., a magnitude.

Because most digital computers are binary computers that perform binary, as opposed to decimal, operations, it has conventionally been necessary to convert decimal data into binary data before processing, such as arithmetic operations, could be performed on that data on most computers. But the conversion is time-consuming and impacts adversely system performance. A scheme was developed that allowed arithmetic operations to be performed on the unpacked decimal digits without conversion. But this scheme required the presence of the code-holding bits for bit-manipulation and temporary storage purposes. Hence, it is not usable with the packed decimal form.

The prior art has attempted to develop a scheme that would allow processing of packed decimal digits directly, without conversion to either the unpacked decimal or binary form. The results have been disappointing. The scheme requires that special hardware be present in a computer for its support. Hence, the scheme is not suited for use on general purpose computers that do not provide that special hardware support. Furthermore, the scheme is cumbersome and inefficient, and thereby negates in large measure the benefits of improved system performance that were sought to be achieved thereby.

Computers have also been developed that provide full hardware support in their arithmetic and logic units for both decimal and binary processing. However, such computers effectively provide separate arithmetic and logic units for the decimal and binary data types. Such duplication is very expensive. And attempts at avoiding complete duplication of arithmetic and logic unit hardware by sharing hardware components between the units introduce undesirable performance-robbing delays into the operation of the arithmetic and logic units.

In summary, then, problems in the art are the lack of a scheme for processing packed decimal data directly, without need for conversion to a different data type, on computers providing no special hardware support therefor, and the lack of a hardware-supported scheme for directly processing packed decimal data that is efficient in terms of both cost and performance.

SUMMARY OF THE INVENTION

This invention is directed to solving these and other problems of the art. According to the invention, combinatorial processing of binary-coded-decimal values, which take the form of two signals each having sequentially-ordered data fields each of which includes a plurality of bits—including a least-significant bit—that define a BCD value, is as follows. If the desired processing involves adding the BCD values defined by the two signals, the binary values of the data fields of the same sequential order are summed with each other and with a value that comprises a plurality of sixes, one six for data fields of the same sequential order. If the desired processing involves subtracting the BCD values, the binary values of the data fields of the same sequential order are subtracted one from the other. Both cases yield a resultant signal that defines a value which represents the result of the performed operation (addition or subtraction). The resultant signal has a plurality of data fields ordered correspondingly to the data fields of the initial two signals, and each field includes a plurality of bits, including a least-significant bit. Values of least-significant bits of data fields of the same sequential order—illustratively of all data fields but those of the least significance in the sequential order—of the initial two signals and of the resultant signal are examined. For every examination of least-significant bit values that include an odd number of zeros in the case of the addition operation, and for every examination of least-significant bit values that include an odd number of ones in the case of the subtraction operation, a six is subtracted from the value of the resultant signal's data field that precedes the compared values in the sequential order of data fields. The values of the data fields of the resultant signal now represent the BCD values that are the combination—sum or difference—of the BCD values of the initial two signals.

Furthermore, a determination is illustratively made whether the summing or difference operation that produced the resultant signal yielded a carry. If the desired processing involves adding the BCD values of the received two signals, a six is subtracted from the value of the most significant data field of the resultant signal if a carry is determined not to have been yielded. If the desired processing involves subtracting the BCD values, a six is subtracted from the value of the most significant data field of the resultant signal if a carry is determined to have been yielded.

The decimal values are processed without conversion thereof to a different data type, yet all of the operations performed on the decimal values are operations whose performance lies within the capability of a binary general purpose computer. Hence, the processing may be performed on computers having no hardware support for decimal data type processing. Consequently, a system for combinatorily processing decimal values may be based on such computers.

Also, providing that its registers and arithmetic and logic unit have a width, in terms of bits, greater than the width of a coded decimal digit, the computer is able to process a plurality of decimal digits in parallel. Processing of decimal digits may consequently be accomplished much faster than if each decimal digit had to be processed sequentially.

Furthermore, hardware support may be provided in a computer for performing the processing—particularly the comparison, carry-checking, and sixes-subtraction operations—which enables the processing to be performed very quickly and efficiently. The hardware support is structurally simple, and easy to incorporate into existing computer designs. It thus avoids the complexity of structure and function, and hence the cumbersomeness and cost, of preceding attempts at hardware-assisted BCD processing.

In an illustrative embodiment, for purposes of ease of implementation, comparing of least-significant bits of the signals is replaced by exclusive-ORing of binary values of the least-significant bits of data fields of the same sequential order, to obtain exclusive-OR values each corresponding with data fields of different sequential order, and the values of least-significant bits of data fields of the resultant signal are compared each with the corresponding exclusive-OR value. Then, for every comparison indicating equality in the case of the addition operation, and for every comparison indicating inequality in the case of the subtraction operation, a six is subtracted from the value of the resultant signal's data field that precedes the compared values in the sequential order of data fields.

Method and apparatus—whether of resource allocation, code compilation, or computer operation—according to the invention as characterized above need not be limited to processing of BCD values, but may be applied to processing of values having a base other than ten. Assuming that binary-coded base-(2n) values take the form of signals each having a plurality of sequentially-ordered data fields each one of which includes m bits, where m and n are positive integers such that $2^m > 2n$, the processing as described above holds true with the exception that the sixes recited in the description are replaced with values equal to $(2^m - 2n)$. The method and apparatus of the invention thus have general applicability to the processing of non-binary values, yet retain the full spectrum of their advantages with respect to non-decimal even-radix numbers.

These and other advantages and features of the present invention will become apparent from the following description of an illustrative embodiment of the invention taken together with the drawing.

DETAILED DESCRIPTION

Figure 1:
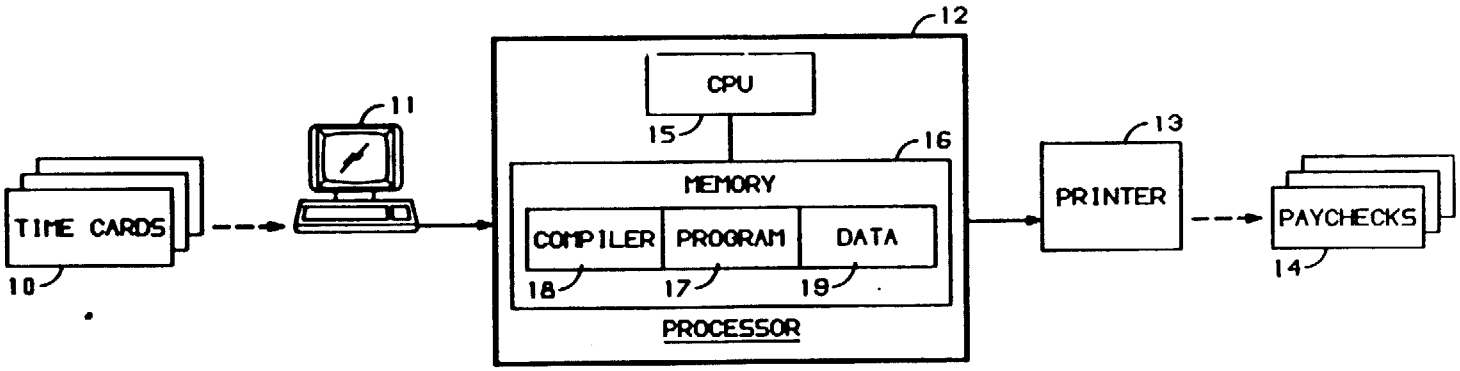
FIG. 1 is a block diagram of an illustrative computer system including an embodiment of the invention.

FIG. 1 is a block diagram of a general purpose com puter programmed to perform business functions, in cluding resource allocation functions, such as payrol functions. Such computers and programs therefor are well known in the art. The computer comprises a pro cessor 12 that performs data processing functions. Pro cessor 12 includes a central processing unit (CPU) 1 which performs operations on data 19 stored in a mem ory 16 according to program instructions 17 also store in memory 16. A terminal 11 connected to processor 1 is used to provide data and control input to processo 12. A printer 13 connected to processor 12 is used t output results of data processing functions from proces sor 12.

Figure 2:
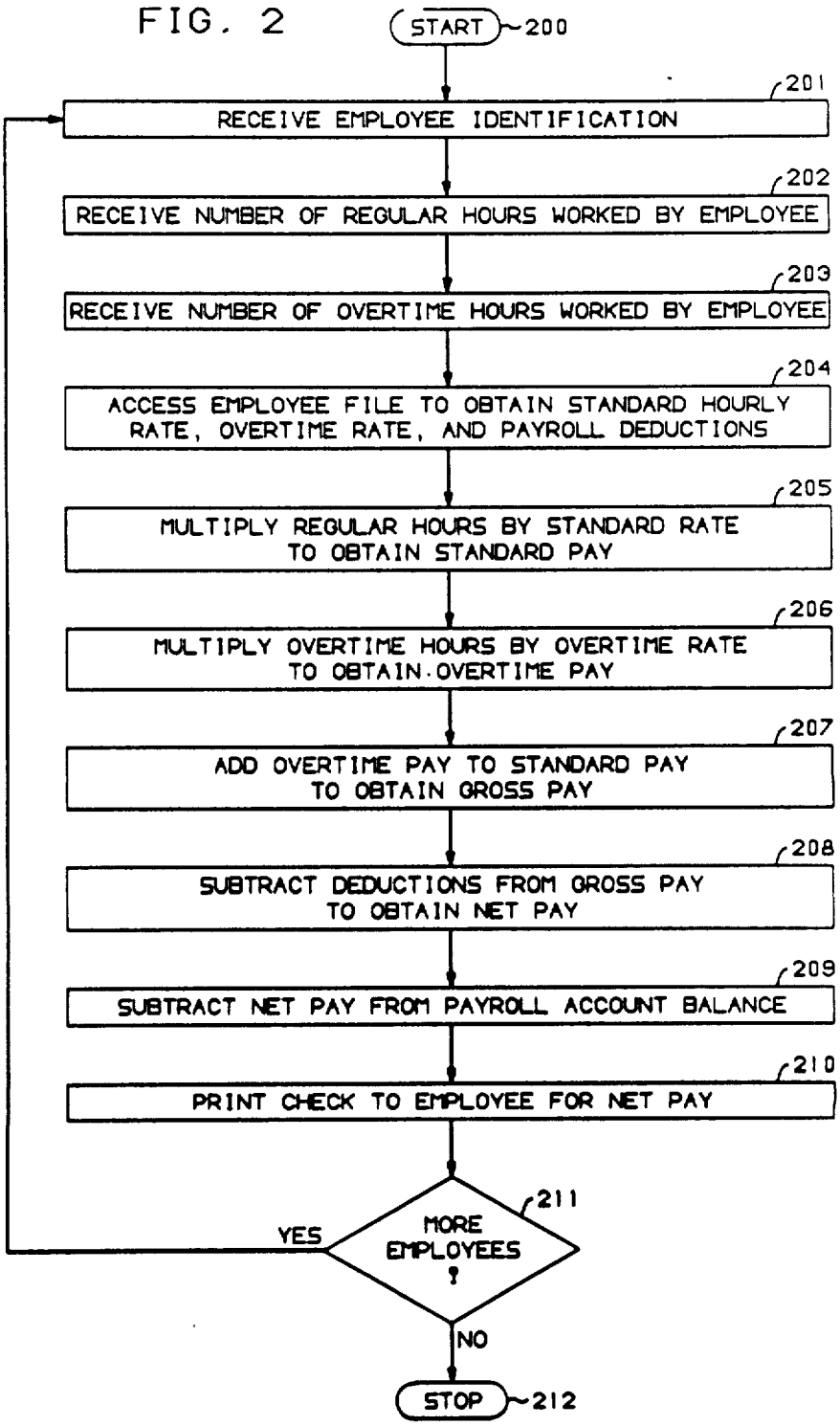
FIG. 2 is a flow diagram of a resource allocation function performed by the system of FIG. 1.

An illustrative example of a conventional payrol function performed by the computer of FIG. 1 is flow charted in FIG. 2 and is described next in conjunctio with FIG. 1. A terminal 11 operator (not shown) direct processor 12 to execute the payroll program, and the takes employee time cards 10 and enters informatio therefrom into the computer via terminal 11. Alterna tively, information from the time cards may be read int the computer by means of a card reader (not shown) Entered information includes the employee's identifica tion—his or her name, for example—the number o regular hours worked, and the number of overtim hours worked.

The payroll program begins to execute on processo 12, at step 200. Processor 12 receives the employe identification, the number of regular hours worked, an the number of overtime hours worked that have bee entered on terminal 11, at steps 201–203, respectivel Processor 12 then identified employee's file in memor 16 to obtain information on that employee's standar hourly rate of pay, the overtime rate of pay, and payro deductions being made for that employee, at step 20 Processor 12 uses CPU 15 to multiply the regular hou worked by the employee by the standard hourly rate t obtain the employee's standard pay, at step 205. Proce sor 12 similarly multiplies the overtime hours worke by the employee by the overtime hourly rate to obtai the employee's overtime pay, at step 205. Processor 1 uses CPU 15 to add the standard pay to the overtim pay to obtain the employee's gross pay, at step 20 Processor 12 uses CPU 15 to subtract the employee deductions from the gross pay to obtain the employee net pay, at step 208. Processor 12 then accesses in men ory 16 the employer's payroll account balance, an subtracts therefrom the employee's net pay, at step 20 Finally, processor 12 causes printer 13 to print a pa check 14 in the employee's name in the amount of t net pay, at step 210.

The net result of the processing that processor 12 has performed has been to reallocate the amount of net pay from the employer's account to the employee. Processor 12 now checks whether input on other employees is being received, at step 211. If so, processor 12 returns to step 201 to repeat the processing for another employee. If not, processor 12 stops executing the program, at step 212.

Business programs, like the payroll program just described, are very often written in the COBOL programming language. COBOL is a "high level" language: programs written in COBOL cannot be executed by a processor directly, but must first be converted into machine language understandable to the processor. This conversion, called compiling, is performed by compilers, in a conventional and well-known manner. Illustratively, a compiler 18 may be a program stored in memory 16 and executing on CPU 15 of processor 12.

Figure 3:
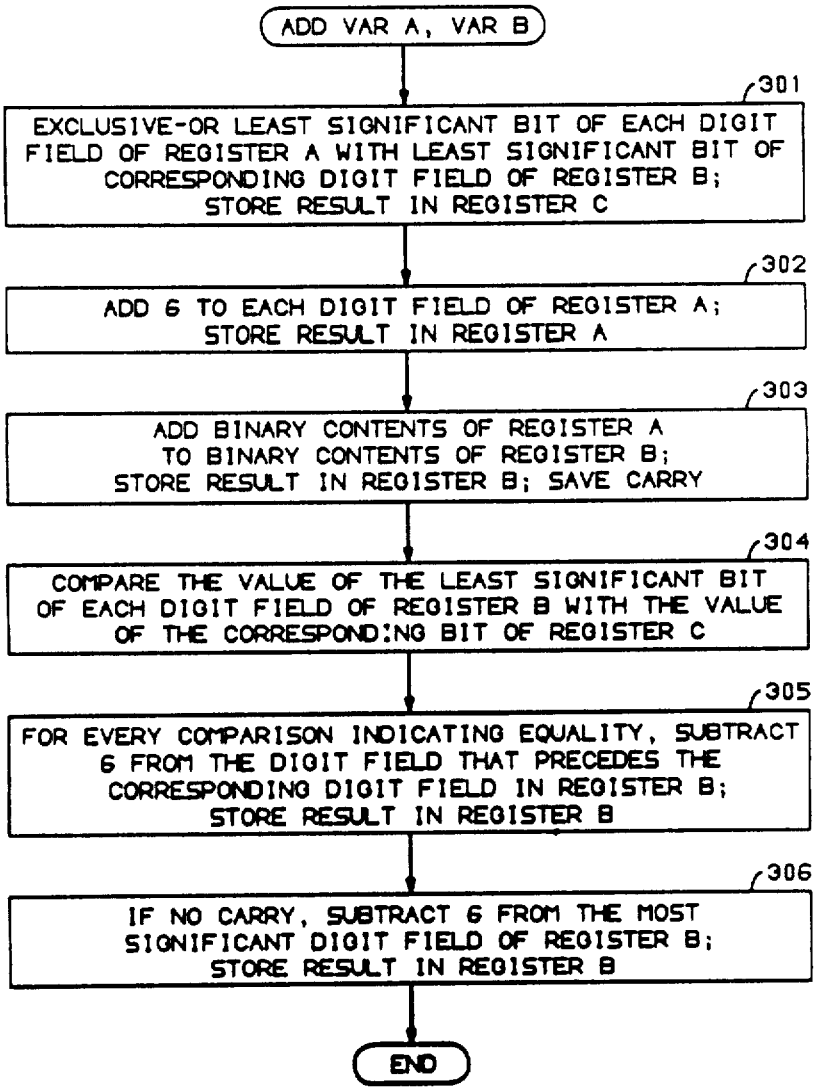
FIG. 3 is a flow diagram of the logical functions of a BCD value summation process performed by the system of FIG. 1 illustratively as part of performance of the function of FIG. 2.

The COBOL programming language supports the packed decimal data type. Data used by COBOL programs—such as hours worked, rate of pay, payroll balance, deductions, and net pay in the example of FIG. 2—may be expressed in processor 16 in packed decimal form. But conventional processors perform binary arithmetic. Hence, when compiler 18 encounters in a COBOL program instructions to perform an arithmetic operation—add, subtract, multiply, or divide, for example—on packed decimal data, it must convert the instructions into one or more machine instructions. In order to cause CPU 15 to perform an arithmetic operation on the packed decimal data directly, i.e., without converting data types, compiler 18 generates code to cause CPU 15 to performed the logical functions flowcharted in FIGS. 3 and 8. Register content manipulations that occur as a consequence of the functions shown in FIGS. 3 and 8 are symbolically shown in the block diagrams of FIGS. 4–7 and 9–12, respectively.

Figure 4:
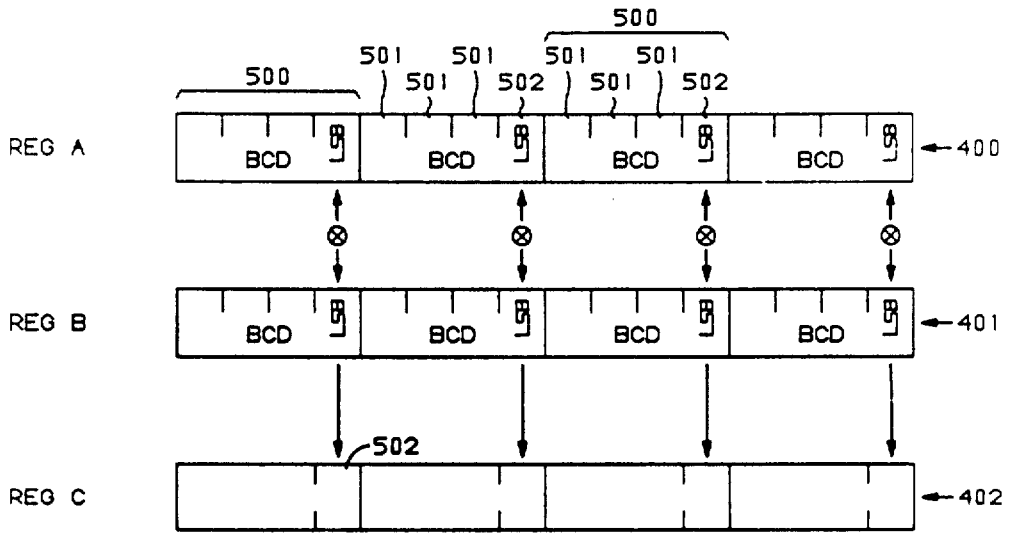
FIGS. 4–7 are block diagrams of register, manipulations occurring in the system of FIG. 1 as a consequence of the performance of the process of FIG. 3.
Figure 5:
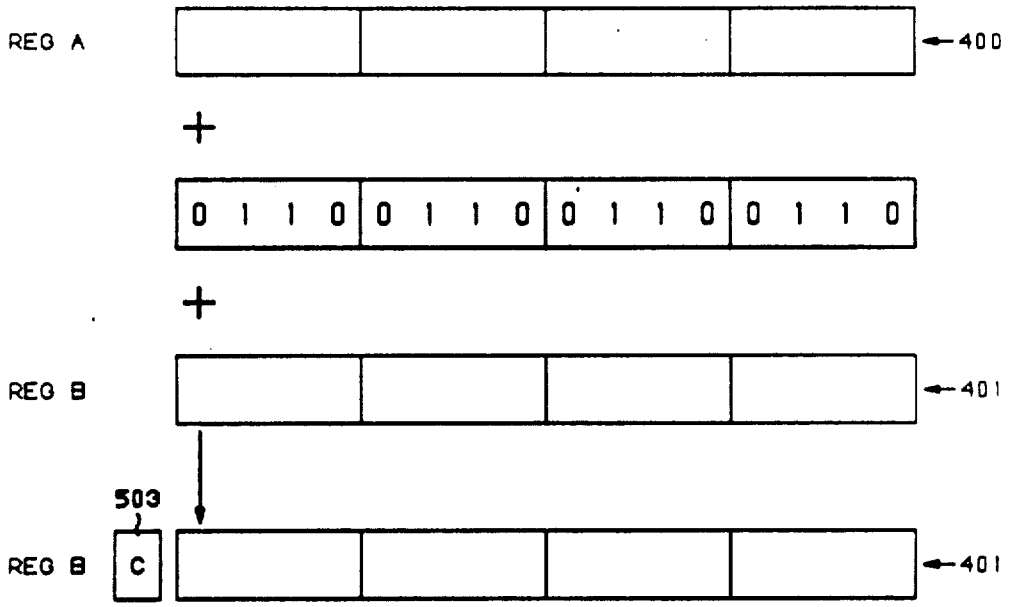
Figure 6:
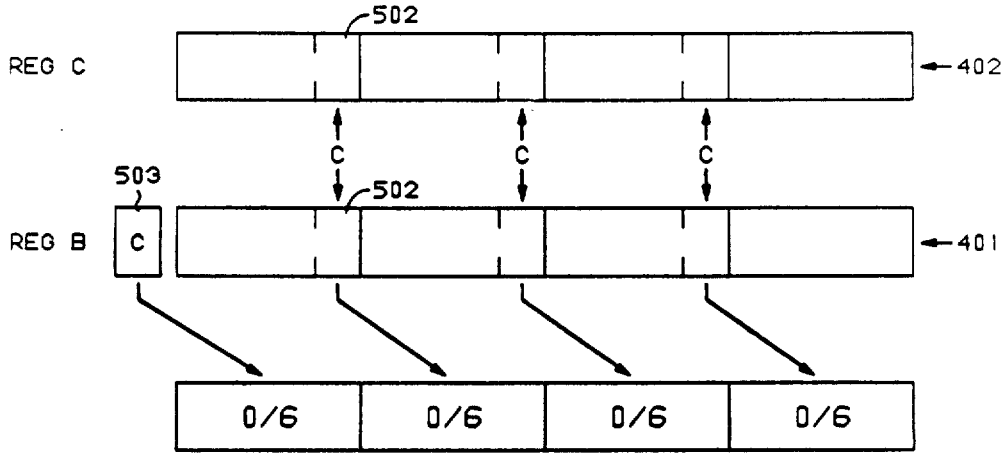
Figure 7:
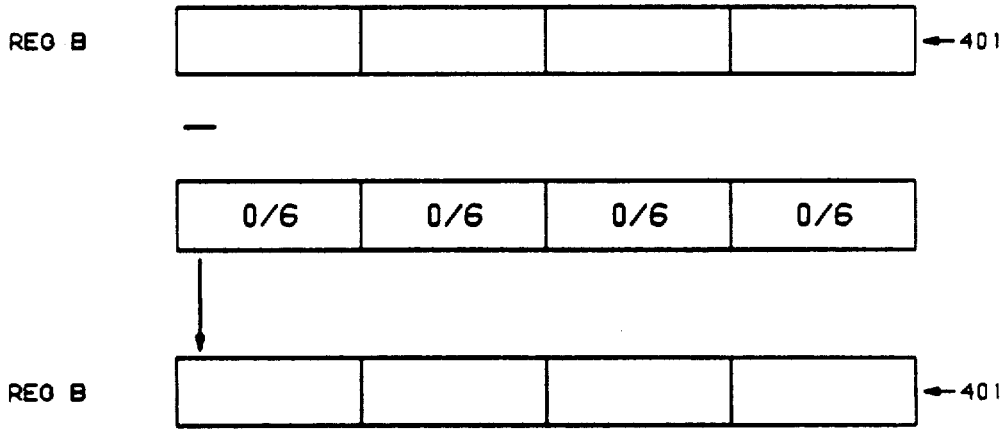

FIG. 4 shows the functions necessary to add values of two variables, var.A and var.B, of packed BCD data type. It is assumed that var.A is stored in register a (reg.a) 400 and var.B is stored in register b (reg.b) 401, as shown in FIG. 4. It is also assumed that each register 400 and 401 is one 16-bit-word wide. Each register 400 and 401 comprises a plurality (four) of fields 500 each of which comprises a plurality (four) of bits 501-502. A four-bit field 500 is commonly referred to as a nibble. Fields 500 of reg.a 400 are sequentially ordered according to their significance with respect to each other. Fields 500 of reg.b 401 are correspondingly ordered. Each field 500 stores a BCD digit. To add BCD contents of reg.a 400 to BCD contents of reg.b 401, the least significant bit 502 of each digit field 500 is exclusively-ORed with the least significant bit 502 of the corresponding digit field 500 of reg.b 401, and the results are stored in corresponding bits 502 of a third register c 402, at step 301 of FIG. 3, as shown in FIG. 4. A six (a binary 0110) is added to each digit field 500 of reg.a 400 with the result being deposited in reg.a 400, at step 303 of FIG. 3, and the binary contents of reg.a 400 are then added to the binary contents of reg.b 401 with the result being deposited in reg.b 401, at step 303, as shown in FIG. 5. Any carry produced by the operation performed at steps 303 is stored in carry flag 503, as shown in FIG. 5. The value of the least significant bit 502 of each digit field 500 of reg.b 401 is then compared with the value of the corresponding bit 502 of reg.c 402, at step 304 of FIG. 3, as shown in FIG. 6. For every comparison at step 304 that indicates equality of the compared bits, six is subtracted from the reg.b 401 digit fiel 500 that precedes the digit field 500 corresponding t the compared bits in the ordering of digit fields 500 i reg.b 401, at step 305 of FIG. 3, as shown in FIGS. and 7. If there is no carry, i.e., if the carry value save at step 303 is zero, six is subtracted from the most signif icant digit field 500 of reg.b 401, at step 306 of FIG. 3 also as shown in FIGS. 6 and 7. At this point, reg.b 40 holds the BCD sum of the BCD values of the variable previously held by reg.a 400 and reg.b 401.

Figure 8:
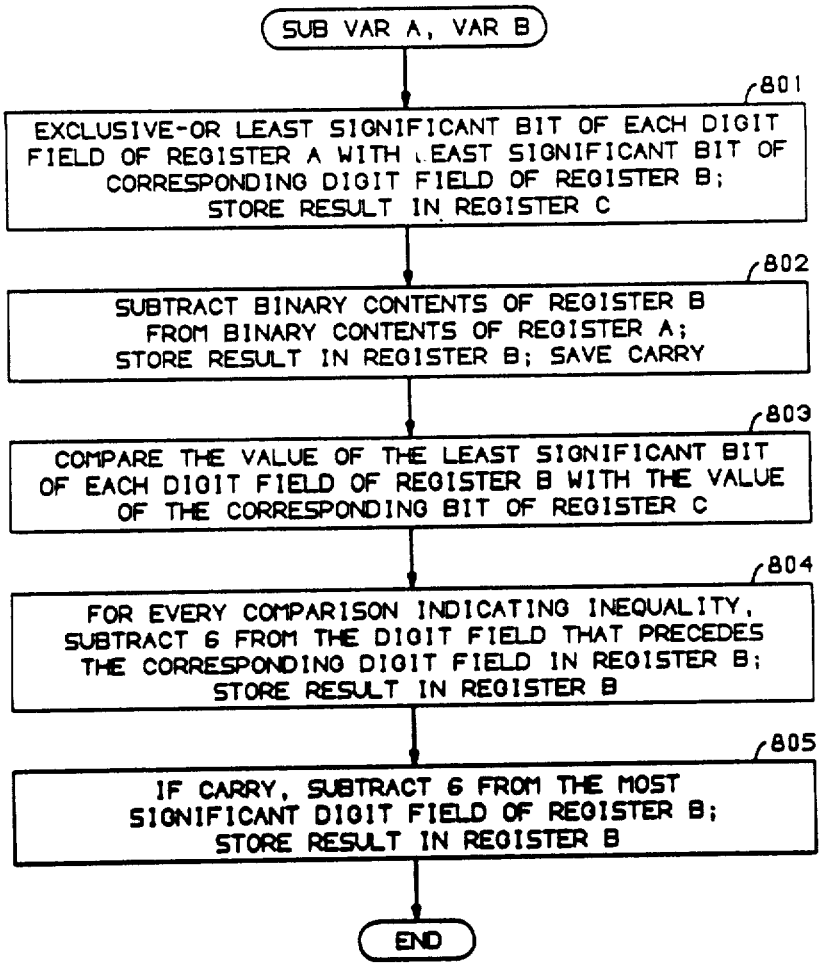
FIG. 8 is a flow diagram of the logical function of a BCD difference-producing process performed by the system of FIG. 1 illustratively as part of performance o the function of FIG. 2.
Figure 9:
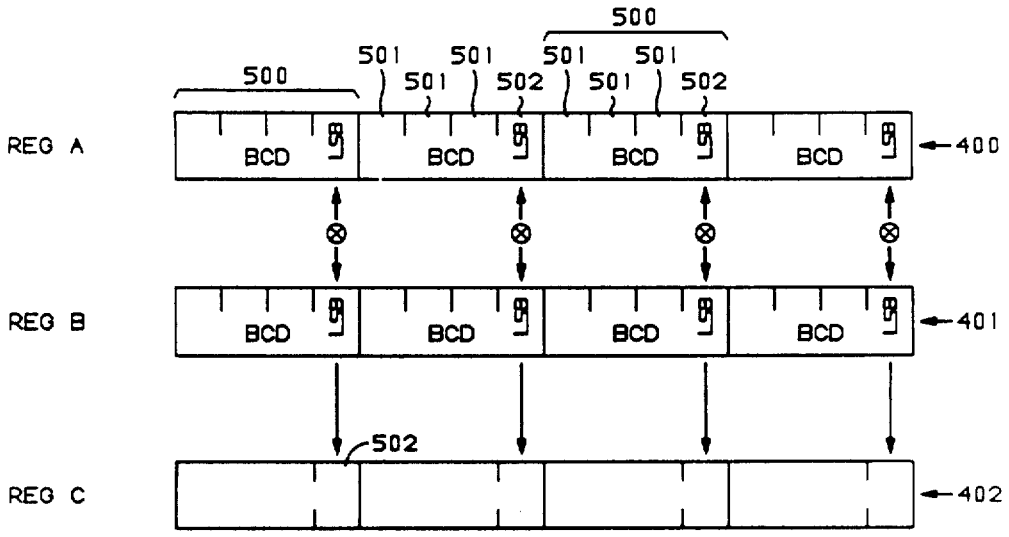
FIGS. 9–12 are block diagrams of register manipula tions occurring in the system of FIG. 1 as a conse quence of the performance of the process of FIG. 8.
Figure 10:
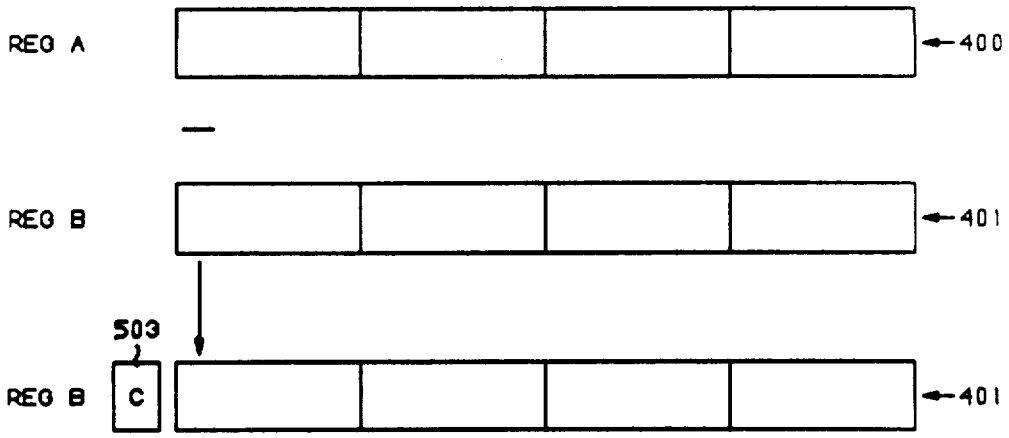
Figure 11:
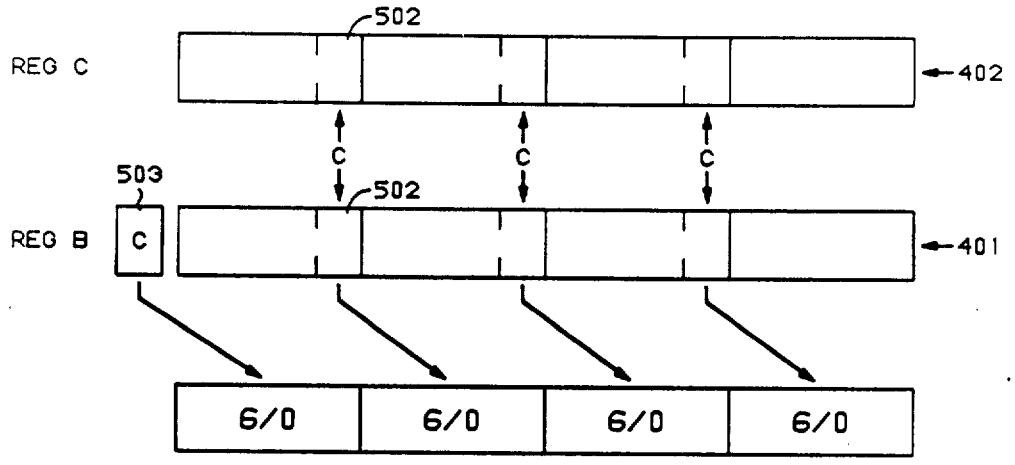
Figure 12:
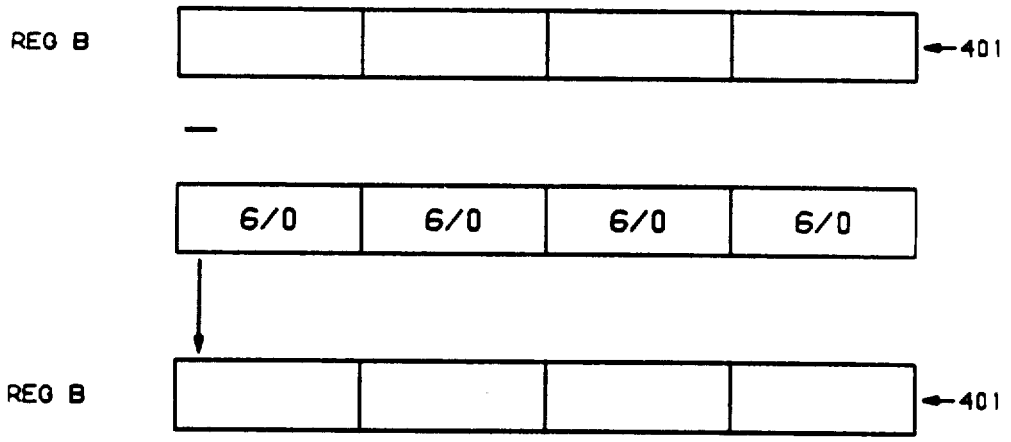

FIG. 8 shows the functions necessary to subtract th BCD values of var.B from the BCD values of var.A. I is assumed as before that var.A is stored in reg.a 400 an var.B is stored in reg.b 401, as shown in FIG. 9. First the least significant bit 502 of each digit field 500 o reg.a 400 is exclusively-ORed with the least significan bit 502 of the corresponding digit field 500 of reg.b 401 and the results are stored in corresponding bits 501 o reg.c 402, at step 801 of FIG. 8, as shown in FIG. 9. Th binary contents of reg.b 401 are then subtracted—illus tratively through a process of 2's complement addition as is conventional on processors—from the binary con tents of reg.a 400, with the results being deposited i reg.b 401 and a carry being saved in carry flag 503, a step 802 of FIG. 8, as shown in FIG. 10. The value o the least significant bit 502 of each digit field 500 o reg.b 401 is then compared with the value of the corre sponding bit 502 of reg.c 402, at step 803 of FIG. 8, a shown in FIG. 11. For every comparison at step 803 that indicates inequality of the compared bits, six i subtracted from the reg.b 401 digit field 500 that pre cedes the digit field 500 corresponding to the compare bits in the ordering of digit fields 500 in reg.b 401, a step 804 of FIG. 8, as shown in FIGS. 11 and 12. If there is a carry, i.e., if the saved carry value is a one, six i subtracted from the most significant digit field 500 o reg.b 401, at step 805 of FIG. 8, also as shown in FIGS 11 and 12. At this point, reg.b 401 holds the BCD differ ence of the BCD values of the variables previously hel by reg.a 400 and reg.b 401.

Multiplication is performed by means of repeate additions and field shifts, while division is performed b means of repeated subtractions and field shifts, as i conventional in processors.

Figure 13:
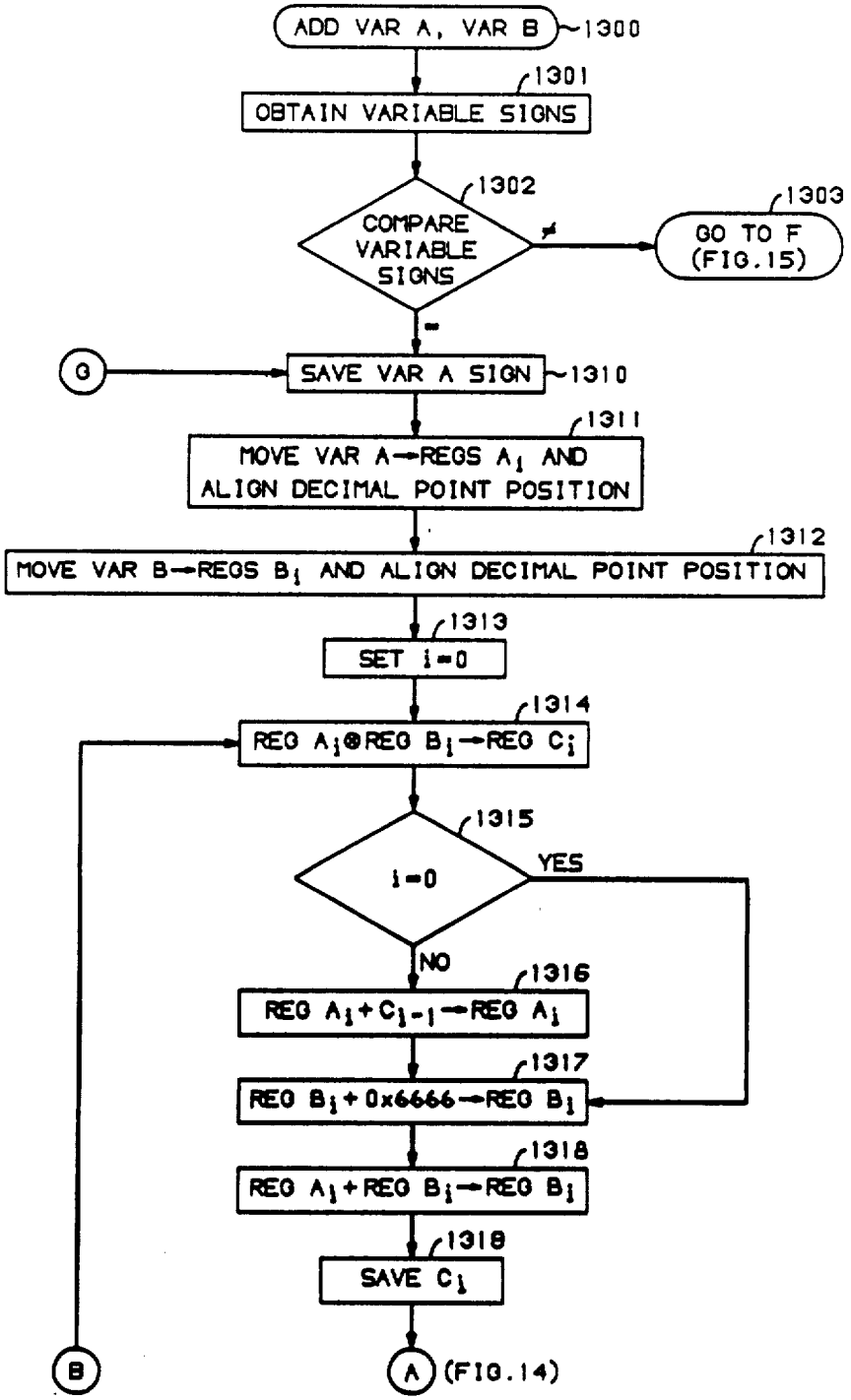
FIGS. 13–17 are flow diagrams of code for the pro cesses of FIGS. 3 and 8 compiled by the compiler of the system of FIG. 1.
Figure 14:
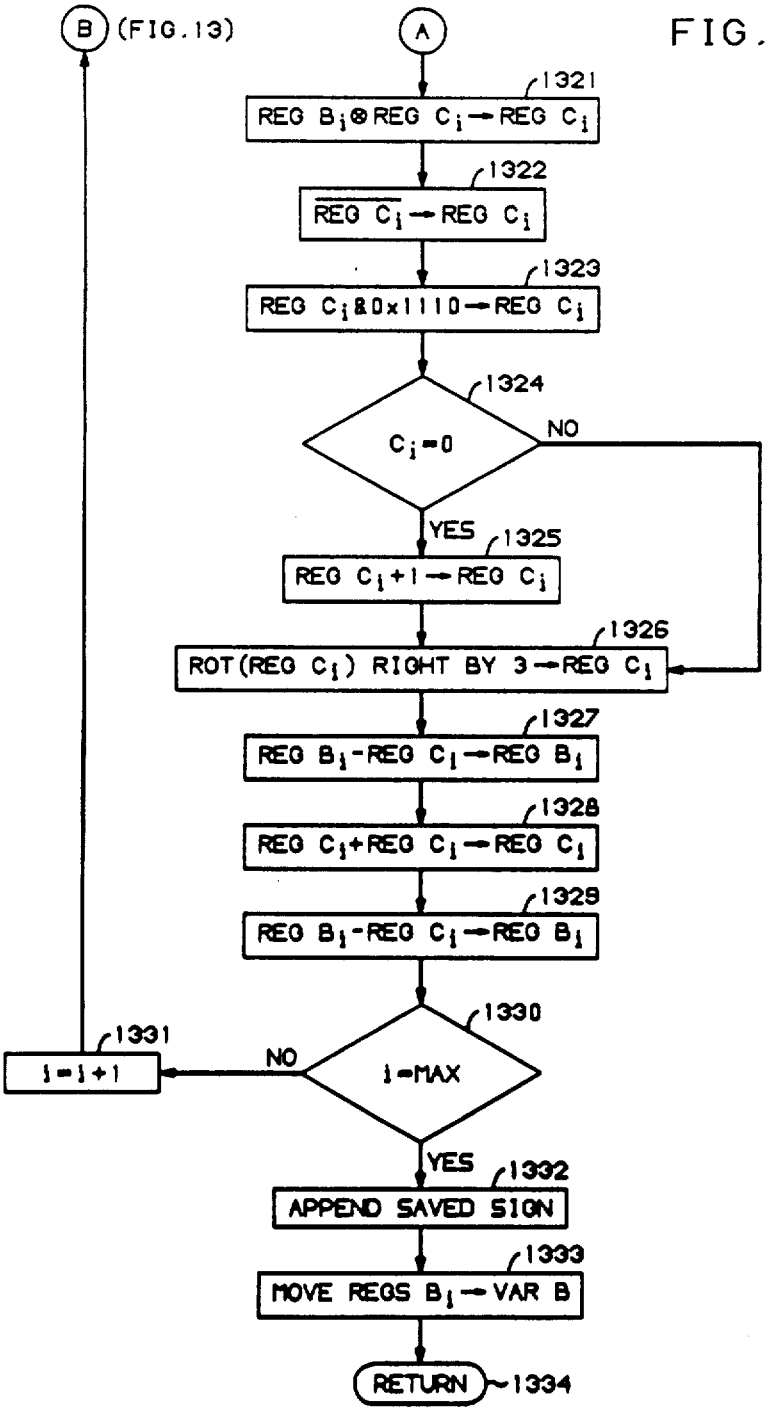

Code for performing activities corresponding to th logical functions of FIGS. 3 and 8 is generated by compiler 18 in compiling a packed decimal data ADD or SUBTRACT operation for a processor 12 that ha no hardware support for packed decimal data opera tions. This code is flowcharted in FIGS. 13–14 an 15–17.

While compiling a source code program, compiler 1 may encounter an instruction "ADD var.A, var.B", a step 1300, where "var.A" is the name of a first variabl of the packed decimal data type and "var.B" is the nam of a second variable of the same type. Compiler 1 knows the data type of the variables from their declara tions. In response, compiler 18 first generates objec code to perform processing of the positive or negativ signs of the variables. Sign processing code is conven tional. For example, compiler 18 generates code t obtain the signs, at step 1301, and to compare the signs at step 1302. Illustratively, the sign of a variable i stored as the least significant nibble of the one or mor memory words storing the packed decimal variabl value, and compiler 18 generates code to retrieve an compare the values of these nibbles.

Figure 15:
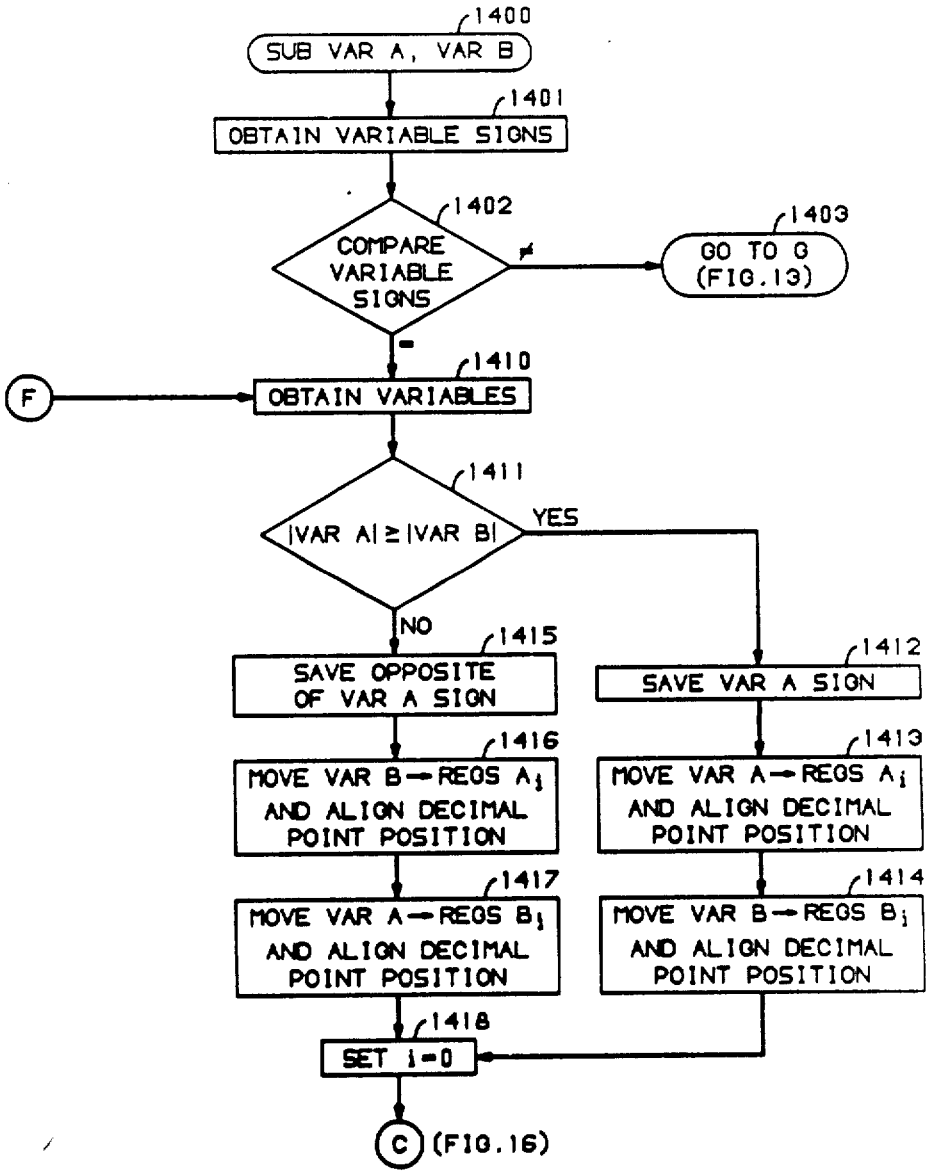
Figure 16:
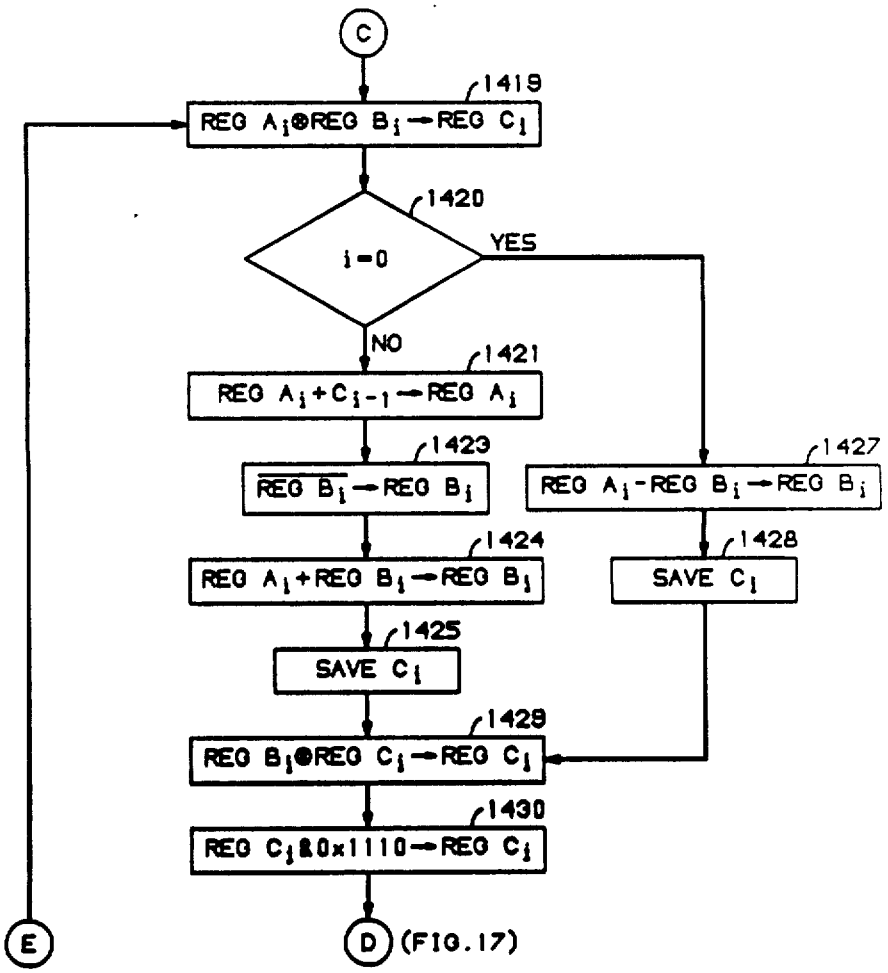
Figure 17:
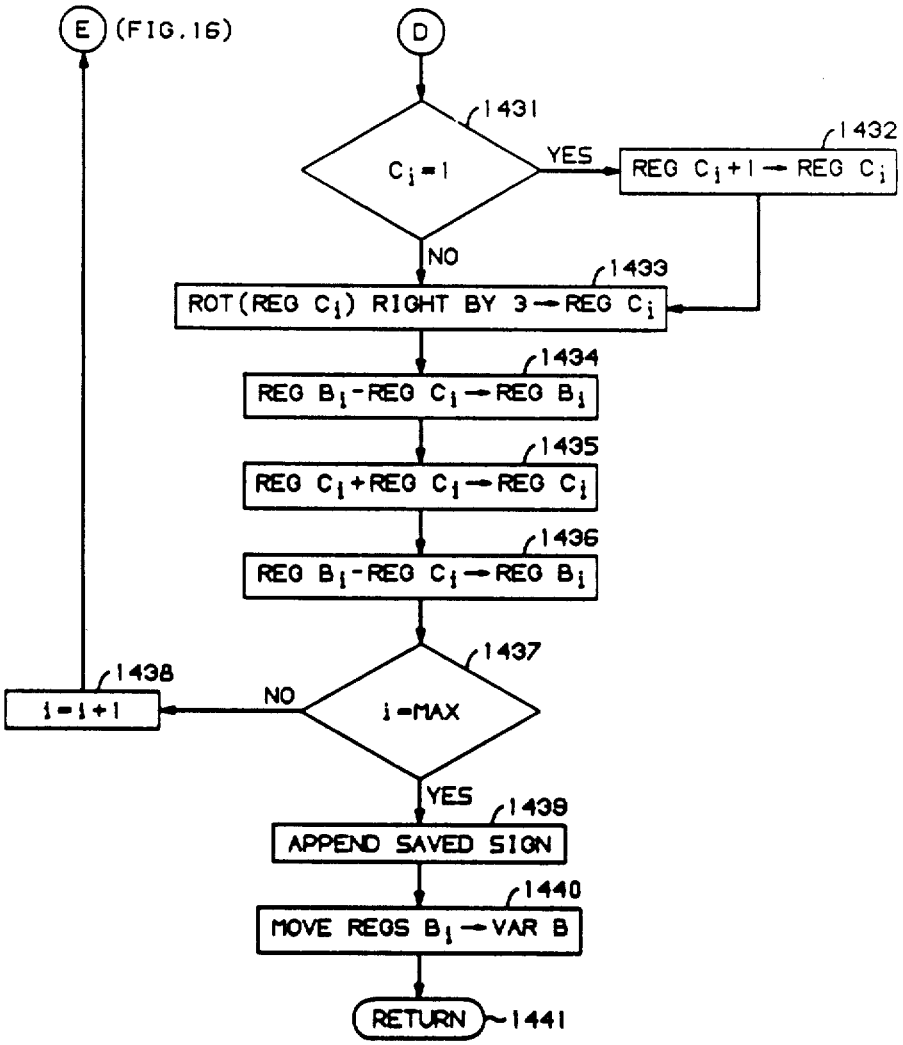
Figure 20:
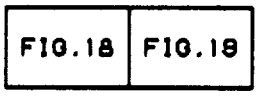
FIG. 20 is a composite showing the arrangement o FIGS. 18–19 to form a single diagram.

For the case of the two variables being found to have different signs when the object code generated at step 1302 is executed, compiler 18 illustratively generates object code to perform a subtraction of variables of the same sign, as suggested at step 1303, as if the encountered instruction had been "SUB var.A, var.B". This code is shown in FIGS. 15–17 and is discussed below.

For the case of the two variables being found to have the same sign when the object code generated at step 1302 is executed, compiler 18 illustratively generates code to save the sign of var.A, at step 1310.

Compiler 18 then generates code to move the variables into logical or physical registers of CPU 15 and to align the variables in the registers by their decimal point position, at steps 1311 and 1312. The code generated to accomplish these functions is likewise conventional. For example, compiler 18 accesses the declarations of the variables to determine how many registers are required to hold their composite, determines the difference in decimal point alignment between the composite and the individual variables, stuffs the variables with zeros so that their decimal point positions become properly aligned with that of the composite, and then generates code to move each variable (i.e., its value) into one or more registers. For ease of reference, registers holding var.A are referred to as reg.s $a_i$, and registers holding var.B are referred to as reg.s $b_i$, where i is an integer taking values from 0 to one-less than the maximum number of registers required to hold a variable. Reg.s $a_0$ and $b_0$ hold the least significant word of the respective variable value.

To generate object code for the addition operation itself, compiler 18 creates a variable i, which will be used to count repeated execution of code that follows, and generates code to set its initial value to 0, at step 1313. Next, compiler 18 generates code to perform an exclusive-OR operation on reg.$a_i$ and reg.$b_i$, and to store the result in reg.$c_i$, at step 1314. (The particular registers a and b involved during any one pass of CPU 15 through this code are, of course, determined by the value of i during that recursion.)

Compiler 18 generates code to check the value of i, at step 1315. For the case when i is determined to be nonzero, compiler 18 generates code to add the value of a carry $c_{i-1}$, generated during the preceding execution of the generated code, to contents of reg.$a_i$ and to store the result in reg.$a_i$, at step 1316.

Compiler 18 then generates code, for all values of i, to add six to each field 500 of reg.$b_i$ and to store the result in reg.$b_i$, at step 1317. Compiler 18 next generates code to add contents of reg.$a_i$ to contents of reg.$b_i$ and store the result in reg.$b_i$, at step 1318, and to save the value of carry $c_i$ generated by this addition, at step 1319. Next, compiler 18 generates code to perform an exclusive-OR operation on reg.$b_i$ and reg.$c_i$, and store the result in reg.$c_i$, at step 1321. Compiler 18 generates code to then form a complement of the contents of reg.$c_i$ and save the result in reg.$c_i$, at step 1322. Compiler 18 generates code to next perform an AND operation between each but the least significant field 500 of reg.$c_i$ and a one, and store the results in reg.$c_i$, at step 1323.

Compiler 18 generates code to then check the value of carry $c_i$, at step 1324. For the case where the value of $c_i$ is zero, compiler 18 generates code to add one to reg.$c_i$, and store the result in reg.$c_i$, at step 1325. For all values of $c_i$, compiler 18 generates code to rotate contents of reg.$c_i$ right by 3 places and to store the result in reg.$c_i$, at step 1326. Compiler 18 next generates code to subtract contents of reg.$c_i$ from contents of reg.$b_i$ and t store the result in reg.$b_i$, at step 1327.

Compiler 18 generates code to add contents of reg. to itself, and store the result in reg.$c_i$, at step 1328. Con piler 18 next generates code to subtract contents reg.$c_i$ from reg.$b_i$ and store the result in reg.$b_i$, at ste 1329. Compiler 18 again generates code to check tl value of i, at step 1330. For the case when the value i is not the maximum, which is one less than the numb of registers holding each of the variables A and B, cor piler 18 generates code to increment the value of i b one and to return to code generated at step 1314 f another execution of that and subsequent code, at st 1331.

For the case when the value of i is maximum, tl addition of var.A and var.B is completed, with tl result stored in reg.s $b_i$. Compiler 18 therefore generat conventional code to append the saved positive or neg tive sign to the result, at step 1332, and to move tl result from reg.s $b_i$ back into var.B in memory, at st 1333. Compiler 18 then returns, at step 1334, to proce and compile another source program instruction.

When compiler 18 encounters an instruction "SU var.A, var.B", directing that the value packed BC data type var.B be subtracted from the value of li var.A, at step 400, compiler 18 again first generat machine code to perform processing of the signs of t variables. The sign processing is, again, convention but for the sake of completeness of description, it briefly described. Compiler 18 generates code to obt the signs, at step 1401, and to compare the signs, at st 1402. For the case of the two variables being found have different signs, compiler 18 generates code perform an addition of variables of the same sign, a the encountered instruction had been "ADD var. var.B", as suggested at step 1403. This code is shown FIGS. 13–14 and was discussed above.

For the case of the two variables being found to ha the same sign when the code of step 1402 is perform compiler 18 generates code to obtain the variable v ues, at step 1410, and to compare their absolute valu at step 1411. This test is done as if var.A and var.B w binary numbers. For the case of var.A being greate magnitude, compiler 18 generates code to save the s of var.A, at step 1412, to move var.A into reg.s $a_i$ align the decimal point position, at step 1413, and move var.B into reg.s $b_i$ and align the decimal pc position, at step 1414. Steps 1413 and 1414 duplic steps 1311 and 1312 of FIG. 13 described above. For case of var.B being greater in magnitude, compiler generates code to save the opposite of the sign of var at step 1415, to move var.B into reg.s $a_i$ and align decimal point position, at step 1416, and to move va into reg.s $b_i$ and align the decimal point position, at 1417.

An alternative to performing steps 1411 1415–1417 is to always perform steps 1412–1414 which case the subsequently-generated code may re in generation of the 10's complement of the des answer. In that case, compiler 18 must generate cod save carry values that may be produced at steps 1 and 1428 and to form a union of these values prio step 1429. Compiler 18 also must generate code, foll ing the below-described code, to check for the complement result (illustratively by checking for al being present in those data fields of the result that more significant than any data fields of the composi var.A and var.B) and to 10's complement such a result to obtain the correct result.

To generate object code for the subtraction operation itself, compiler 18 creates a variable i, which will be used to count repeated execution of code that follows, and generates object code to set its initial value to 0, at step 1418. Next, compiler 18 generates code to perform an exclusive-OR operation on reg.$a_i$ and reg.$b_i$ and to store the result in reg.$c_i$, at step 1419.

Compiler 18 then generates code to check the value of i, at step 1420. For the case when i is determined to be non-zero, compiler generates code to add the value of a carry $c_{i-1}$, generated during the preceding recursion through the code, to contents of reg.$a_i$ and to store the result in reg.$a_i$, at step 1421; to complement contents of reg.$b_i$ and store the result in reg.$b_i$, at step 1423; to add contents of reg.$a_i$ to contents of reg.$b_i$ and store the result in reg.$b_i$, at step 1424; and to save the value of carry $c_i$ generated by this addition, at step 1425.

For the case when i is determined to be zero by execution of code generated at step 1420, compiler 18 generates code to subtract contents of reg.$b_i$ from contents of reg.$a_i$ and store the result in reg.$b_i$, at step 1427, and to save the value of carry $c_i$ generated by this subtraction, at step 1428.

Next, for all values of i, compiler 18 generates code to perform an exclusive-OR operation on reg.$b_i$ and reg.$c_i$ and to store the result in reg.$c_i$, at step 1429. Compiler 18 generates code to then perform an AND operation between each but the least significant data field 500 of reg.$c_i$ and a one and store the results in reg.$c_i$, at step 1430. Compiler 18 generates code to then check the value of carry $c_i$, at step 1431. For the case where the value of $c_i$ is one, compiler 18 generates code to add one to reg.$c_i$ and store the result in reg.$c_i$, at step 1432. For all values of $c_i$, compiler generates code at steps 1433–1439 that duplicates code generated at steps 1326–1333 of FIG. 14 and described above. Compiler 18 then returns, at step 1441, to process and compile another source program instruction.

Figure 18:
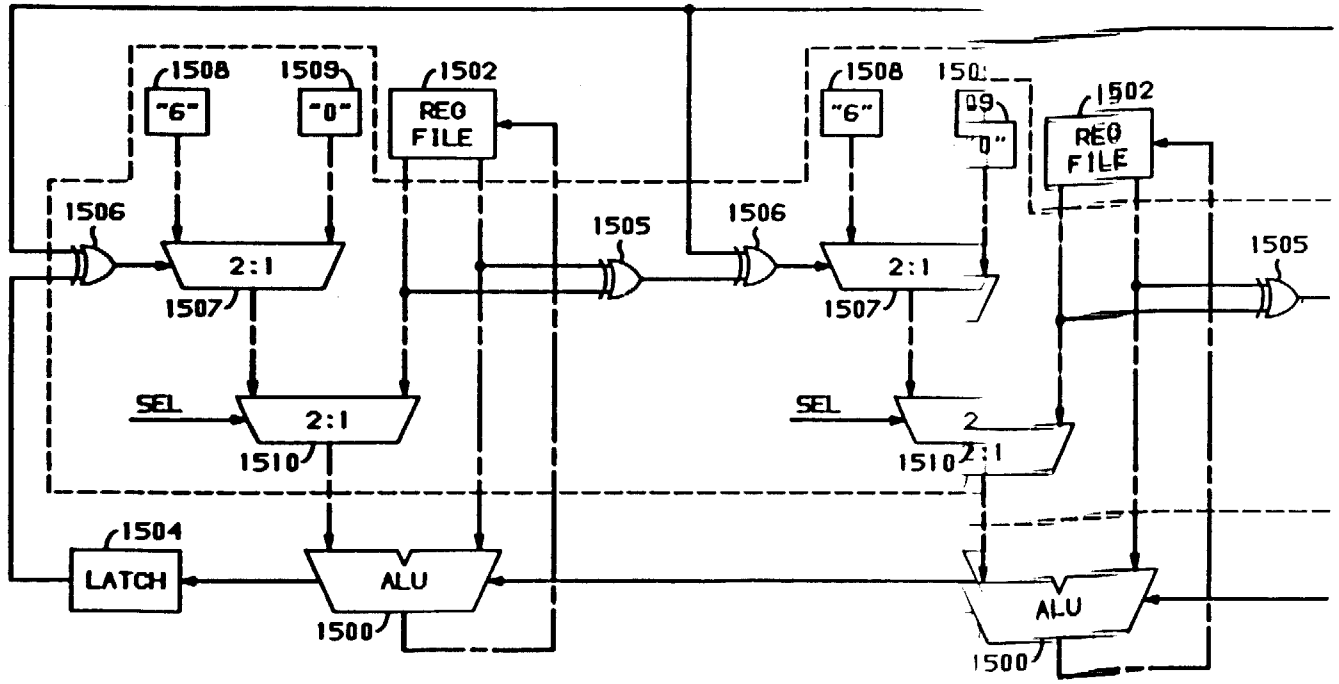
FIGS. 18–19 are a block diagram of structural addi tions made to the CPU of the system of FIG. 1 to pro vide hardware support therein for the processes o FIGS. 3 and 8.
Figure 19:
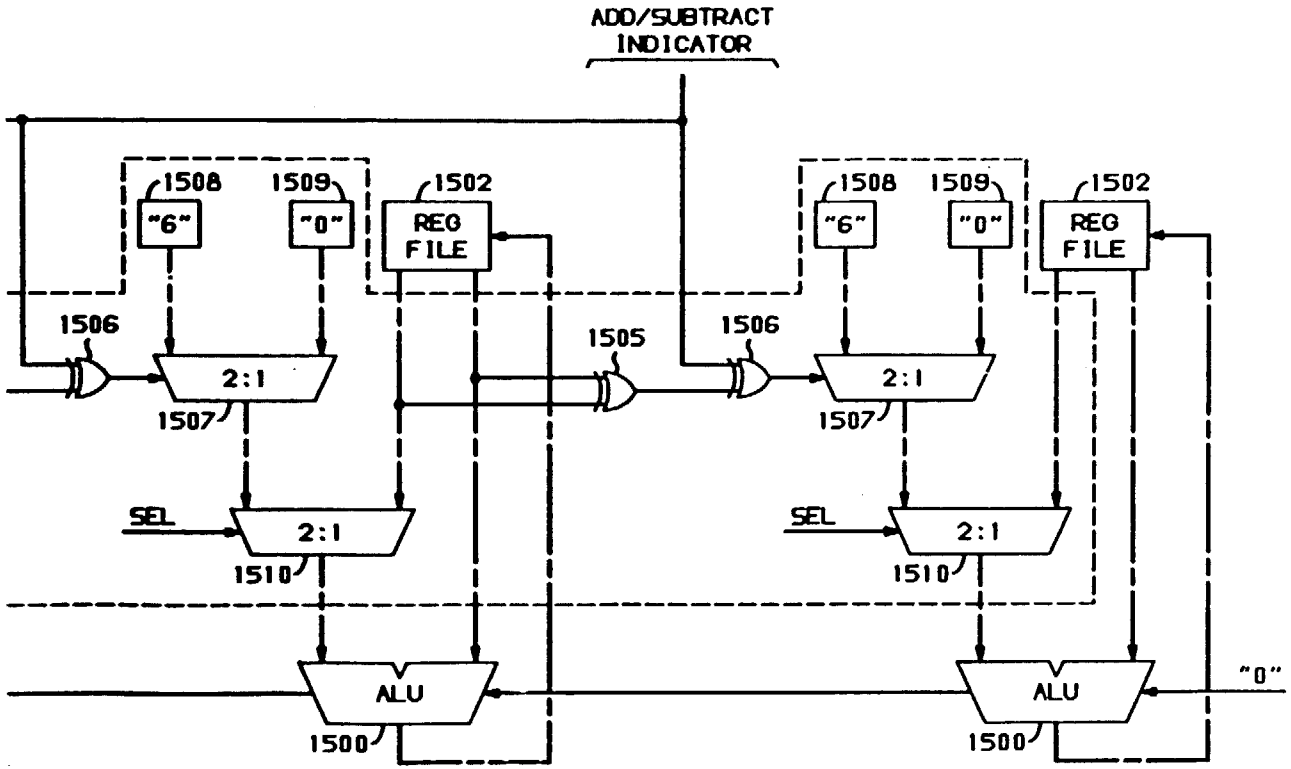

A program, compiled as described above, is suited for execution on a processor 12 that provides no special hardware support for performing packed BCD operations. Speed and efficiency of those operations may be improved by providing hardware support therefor. A suitable modification to the CPU 15 of processor 12 to provide such support is shown surrounded by dashed lines in FIGS. 18–19. Only those conventional portions of the CPU 15 necessary for an understanding of the structure and function of the modification are shown in FIGS. 18–19.

CPU 15 is assumed to be the CPU of a 16-bit processor 12: CPU 15 processes in parallel the bits of a 16-bit wide word. CPU 15 "slices" each word into fourbit nibbles: CPU 15 comprises four identical stages, each one of which processes in parallel four bits of a word, and the four stages operate simultaneously and perform identical operations. Each stage is effectively a separate CPU. Each stage comprises a conventional arithmetic and logic unit (ALU) 1500, each input port of which is connected by four leads to a different output port of a nibble-wide slice of register file 1502. Register file 1502 holds an array of registers including registers selected to serve a regs.a 400, regs.b 401, and regs.c 402. The output port of ALU 1500 is connected by four leads to a bus (not shown) that, inter alia, connects the output port of each ALU 1500 to the input port of the associated slice of register file 1502. This connection is suggested in FIGS. 18–19 by the four-lead connection between the output port of each ALU 1500 and the input port of the associated slice of register file 1502.

A carry output terminal of each ALU 1500 is connected by a 1-bit-wide connection to a carry input terminal of each "subsequent" ALU 1500. A "subsequent" ALU 1500 is one responsible for processing the next most significant nibble 500 of a register, whereas a "preceding" ALU 1500 is one responsible for processing the next least significant nibble 500 of each register. The carry output terminal of the last ALU 1500 is connected to a carry latch 1504. Latch 1504 implements carry flag 503.

The modification to the conventional CPU 15 is as follows. The least significant bit 502 leads of each of the two output ports of a slice of register file 1502 are connected to inputs of an exclusive-OR gate 1505. Output of gate 1505 and an ADD/SUB INDICATOR control lead are connected to the inputs of an exclusive-OR gate 1506, whose output is connected to the SELect input of a two-to-one multiplexer 1507. Input ports of multiplexer 1507 are each connected to a different one of two registers 1508 and 1509. Register 1508 permanently stores a binary 6 value, while register 1509 stores a zero value. Output port of multiplexer 1507 is connected by four leads to an input port of a two-to-one multiplexer 1510. The other input port and the output port of multiplexer 1510 intercepts a formerly-direct connection between an output port of a slice of register file 1502 and an input port of ALU 1500.

When compiling programs for a processor 12 having a CPU 15 modified as shown in FIGS. 18–19, compiler 18 replaces all code generated at steps 1321–1329 with a single new machine instruction, illustratively named decimal adjust add. Similarly, compiler 18 replaces all code generated at steps 1429–1436 with a single new machine instruction, illustratively named decimal adjust subtract.

In response to the decimal adjust add instruction, a controller (not shown) of CPU 15 which directs actions of elements of CPU 15 in performing operations sets to a logical "1" level the ADD/SUBTRACT INDICATOR line, asserts the SEL lead of each multiplexer 1510 to connect the output port of multiplexer 1507 to the output port of multiplexer 1510, causes each slice of register file 1502 to output contents of the nibble 500 of reg.$c_i$ that it is holding at the output port connected to multiplexer 1510 and to output at the other output port port contents of the nibble 500 of reg.$b_i$ that it is holding, and causes each ALU 1500 to perform a subtract operation. The controller then causes the output of each ALU 1500 to be stored in the nibble 500 of reg.$b_i$ held by the connected register file 1502.

Functions performed by the CPU 15 controller in response to the decimal adjust subtract instruction are identical to those performed for the decimal adjust add instruction, except that the ADD/SUBTRACT INDICATOR line is set to a logical "0" level.

Contents of latch 1504 are combined with either the "1" add signal or "0" subtract signal from ADD/SUBTRACT INDICATOR line by exclusive-OR gate 1506. Output of gate 1506 is thus "1" if there is no carry and 0 if there is a carry on the addition operation, and is reversed on the subtract operation. A "1" output of gate 1506 causes multiplexer 1507 to channel contents of register 1508 to multiplexer 1510. A "0" output of gate 1506 causes multiplexer 1507 to channel contents of register 1509 to multiplexer 1510. Assertion of SEL line of multiplexer 1510 causes it to couple output of multiplexer 1507 to an input port of ALU 1500.

The least significant bits 502 of two nibbles 500 are combined by exclusive-OR gate 1505. Output of gate 1505 is therefore a "1" only if one input is a "1" and the other input is a "0". Output of gate 1505 is combined with the ADD/SUBTRACT INDICATOR line signal by exclusive-OR gate 1506, in the manner described above for latch 1504 contents.

Of course, it should be understood that various changes and modifications to the illustrative embodiment described above will be apparent to those skilled in the art. For example, implementation of the CPU hardware modifications may differ with the design of the particular CPU and the technology used to implement the modifications. Or, the sixes may be added to an operand before the exclusive-OR of the operands' least significant bits is performed. Or, this exclusive-OR operation may be replaced by an exclusive-NOR operation or any set of one or more operations that produce the same result: compare the least significant bits to determine and indicate whether they match, i.e., are equal; the subtraction of sixes may then be based on a comparison indicating inequality in the case of addition and equality in the case of subtraction if the indication of the results of the first-mentioned comparison produces binary values opposite to those produced by a positive-logic exclusive-OR operation. Also, the comparisons need not be performed first between the least significant bits of the operands and then between the results of this comparison and the least significant bits of the result of the summing or subtracting of the operands, but may be performed between the least significant bits of one of the operands and the result of the summing or subtracting of the operands, and then between results of this comparison and the least significant bits of the other operand. Also, the invention may be used to process digits coded in formats having other than a decimal base, for example, having a base of (2n), the difference being the substitution of a value $(2^m-2n)$ for each six used in the illustrative embodiment where m and n are positive integers such that $2^m>2n$ and m is the number of bits in a data field 500. Furthermore, the compilation may be optimized because the compiler may have enough information available to it—variable sign information, for example—from variable declarations so that it can avoid generating code for alternatives that it knows will not exist. Finally, instead of a compiler, an interpreter or some other entity may be used to interpret or otherwise process the source code instructions, for example by calling or invoking library subroutines or macros to execute the instructions in the above-described manner. Accordingly, for purposes of this application, the term "generating" of code includes within its meaning compiling, interpreting, invoking, or calling. Such changes and modifications can be made without departing from the spirit and scope of the invention and without diminishing its attendant advantages. It is therefore intended that all such changes and modifications be covered by the following claims.

What is claimed is:

1. A method of generating object-program code from source-program code, comprising the steps of:

receiving source code specifying operation on two operands;

generating object code for obtaining two signals each representing a different one of the operands and each having a plurality of sequentially-ordered data fields each of which includes a plurality of bits, including a least-significant bit, defining a binary-coded-decimal value;

generating object code for summing binary values of the fields of the same sequential order and a value comprising a plurality of sixes, one six for data fields of the same sequential order, to get a resultant signal defining a value representing the result of the summing and having a plurality of data fields ordered correspondingly to the data fields of the obtained signals and each including a plurality of bits including a least-significant bit;

generating object code for examining values of least-significant bits of data fields of the same sequential order of the two obtained signals and the resultant signal; and generating object code for subtracting, for each examination of least-significant bit values that include an odd number of zeros, six from the value of the data field of the resultant signal preceding the compared values in the sequential order of data fields, to obtain a modified resultant signal;

whereby an object program comprising the generated object code yields the modified resultant signal defining binary-coded-decimal values representing the result of the operation on the two operands.

2. The method of claim 1 further comprising the steps of:

generating object code for determining whether execution of the summing object code yielded a carry; and generating object code for subtracting six from the v of the most-significant data field of the resultant signal if a carry is determined not to have been yielded.

3. A method of generating object-program code from source-program code, comprising the steps of:

receiving source code specifying an operation on two operands;

generating object code for obtaining two signals each representing a different one of the operands and each having a plurality of sequentially-ordered data fields each of which includes a plurality of bits, including a least-significant bit, defining a binary-coded-decimal value;

generating object code for subtracting binary values of the data fields of the same sequential order, to get a resultant signal defining a value representing the result of the subtracting and having a plurality of data fields ordered correspondingly to the data fields of the obtained signals and each including a plurality of bits including a least-significant bit;

generating object code for examining values of least-significant bits of data fields of the same sequential order of the obtained signals and the resultant signal; and generating object code for subtracting, for each examination of least-significant bit values that include an odd number of ones, six from the value of the data field of the resultant signal preceding the compared values in the sequential order of data fields, to obtain a modified resultant signal;

whereby an object program comprising the generated object code yields the modified resultant signal defining binary-coded-decimal values representing the result of the operation on the two operands.

4. The method of claim 3 further comprising the steps of:

generating object code for determining whether execution of the object code for subtracting data field values yielded a carry; and generating object code for subtracting six from the value of the most-significant data field of the resultant signal if a carry is determined to have been yielded.

5. A method of generating object-program code from source-program code, comprising the steps of:

receiving source code specifying addition of two binary-coded-decimal operands;

identifying two registers each having contents representing a different one of the operands and each including a plurality of sequentially-ordered nibbles each having a plurality of bits including a least-significant bit, the values of the plurality of bits of each nibble together representing a binary-coded-decimal value;

generating object code for exclusive-ORing the values tne least-significant bits of nibbles of the same order, to obtain in a third register a plurality of bits each having an exclusive-OR value corresponding with nibbles of a different order;

generating object code for adding binary values represented by the bits of the two registers and a value comprising a plurality of sixes, one six for each nibble of one register, to obtain in the one register a resultant value represented by the bits of the one register;

generating object code for comparing the values of the least-significant bits of nibbles of the one register each with the value of the corresponding bit of the third register; and generating object code for subtracting, for every comparison indicating equality, six from the value of the nibble of the one register preceding the compared values in the order;

whereby an object program comprising the generated object code is for obtaining in the nibbles of the one register binary-coded-decimal values representing the sum of the binary-coded-decimal values initially held by the two registers.

6. The method of claim 5 further comprising the steps of:

generating object code for determining whether execution of the object code for adding yielded a carry; and generating object code for subtracting six from the most-significant nibble of the one register if a carry is determined not to have been yielded.

7. A method of generating object-program code from source-program code, comprising the steps of:

receiving source code specifying subtraction of two binary-coded-decimal operands;

identifying two registers each having contents representing a different one of the operands and each including a plurality of sequentially-ordered nibbles each having a plurality of bits including a least-significant bit, the values of the plurality of bits of each nibble together representing a binary-coded-decimal value;

generating object code for exclusive-ORing the values of the least-significant bits of nibbles of the same order, to obtain in a third register a plurality of bits each having an exclusive-OR value corresponding with nibbles of a different order;

generating object code for subtracting binary values represented by the bits of the two registers, to obtain in one register a resultant value represented by the bits of the one register;

generating object code for comparing the values of the least-significant bits of nibbles of the one register each with the value of the corresponding bit of the third register; and generating object code for subtracting, for every comparison indicating inequality, six from the value of the nibble of the one register preceding the compared values in the order;

whereby an object program comprising the generated object code is for obtaining in the nibbles of the one register binary-coded-decimal values representing the difference of the binary-coded-decimal values initially held by the two registers.

8. The method of claim 7 further comprising the steps of:

generating object code for determining whether execution of the object code for subtracting the two registers' binary values yielded a carry; and generating object code for subtracting six from the most-significant nibble of the one register if a carry is determined to have been yielded.

9. A method of allocating a resource to a resource user comprising the steps of:

representing two portions of the resource each by a different signal, each signal having a plurality of sequentially-ordered data fields each of which includes a plurality of bits, including a least-significant bit, defining a binary-coded-decimal value;

summing binary values of the data fields of the same sequential order and a value comprising a plurality of sixes, one six for data fields of the same sequential order, to get a resultant signal defining a value representing the result of the summing and having a plurality of data fields ordered correspondingly to the data fields of the representing signals and each including a plurality of bits including a least-significant bit;

examining values of least-significant bits of data fields of the same sequential order of the representing signals and the resultant signal;

for each examination of least-significant bit values that include an odd number of zeros, subtracting six from the value of the data field of the resultant signal preceding the compared values in the sequential order of data fields, to obtain a modified resultant signal; and allocating to the user a portion of the resource represented by binary-coded-decimal values defined by the modified resultant signal.

10. The method of claim 9 further comprising the steps of:

determining whether the step of summing yielded a carry; and subtracting six from the value of the mostsignificant data field of the resultant signal if a carry is determined not to have been yielded.

11. A method of allocating a resource to a resource user comprising the steps of:

representing two portions of the resource each by a different signal, each signal having a plurality of sequentially-ordered data fields each of which includes a plurality of bits, including a least-significant bit, defining a binary-coded-decimal value;

subtracting binary values of the data fields of the same sequential order, to get a resultant signal defining a value representing the result of the subtracting and having a plurality of data fields ordered correspondingly to the data fields of the representing signals and each including a plurality of bits including a least-significant bit;

examining values of least-significant bits of data fields of the same sequential order of the representing signals and the resultant signal:

for each examination of least-significant bit values that include an odd number of ones, subtracting six from the value of the data field of the resultant signal preceding the compared values in the sequential order of data fields, to obtain a modified resultant signal; and allocating to the user a portion of the resource represented by binary-coded-decimal values defined by the modified resultant signal.

12. The method of claim 11 further comprising the steps of:

determining whether the step of subtracting data field values yielded a carry; and subtracting six from the value of the most-significant data field of the resultant signal if a carry is determined to have been yielded.

13. A method of allocating a resource to a resource user comprising the steps of:

representing two portions of the resource each by contents of a different register, each register including a plurality of sequentially-ordered nibbles each having a plurality of bits, including a least-significant bit, and defining a binary-coded-decimal value;

exclusive-ORing the values of the least-significant bits of nibbles of the same order, to obtain in a third register a plurality of bits each having an exclusive-OR value corresponding with nibbles of a different order;

adding binary values represented by the bits of the two registers and a value comprising a plurality of sixes, one six for each nibble of one register, to obtain in the one register a resultant value represented by the bits of the one register;

comparing the values of the least-significant bits of nibbles of the one register each with the value of the corresponding bit of the third register;

for every comparison indicating equality, subtracting six from the value of the nibble of the one register preceding the compared values in the order; and allocating to the user a portion of the resource represented by binary-coded-decimal values contained in the one register.

14. The method of claim 13 further comprising the steps of:

determining whether the step of adding yielded a carry; and subtracting six from the value of the most-significant nibble of the one register if a carry is determined not to have been yielded.

15. A method of allocating a resource to a resource user comprising the steps of:

representing two portions of the resource each by contents of a different register, each register including a plurality of sequentially-ordered nibbles each having a plurality of bits, including a least-significant bit, and defining a binary-coded-decimal value;

exclusive-ORing the values of the least-significa bits of nibbles of the same order, to obtain in a thi register a plurality of bits each having an exclusiv OR value corresponding with nibbles of a differe order;

subtracting binary values represented by the bits the two registers, to obtain in one register a resu tant value represented by the bits of the one regi ter;

comparing the values of the least-significant bits nibbles of the one register each with the value the corresponding bit of the third register;

for every comparison indicating inequality, subtrac ing six from the value of the nibble of the one regi ter preceding the compared values in the orde and allocating to the user a portion of the resource repr sented by binary-coded-decimal values contain in the one register.

16. The method of claim 15 further comprising tl steps of:

determining whether the step of subtracting the tw registers' binary values yielded a carry; and subtracting six from the value of the mostsignifica nibble of the one register if a carry is determined have been yielded.

17. A method of operating a digital computer f combining two received digital signals, each having plurality of sequentially-ordered data fields each which includes m bits including a least-significant b and a value defined by the bits representing a binar coded base-(2n) value, m and n being positive intege such that $2^m > 2n$, the method comprising the steps o summing binary values of the data fields of the san sequential order and a plurality of values ea equal to $(2^m - 2n)$, one value for data fields of tl same sequential order, to get a resultant sign defining a value representing the result of the sur ming and having a plurality of data fields order correspondingly to the data fields of the receiv signals and each including m bits including a lea significant bit:

comparing values of least-significant bits of data the same sequential order of the received signa and the resultant signal; and for each comparison of least-significant bit values th include an odd number of zeros, subtracting a val equal to $(2^m - 2n)$ from the value of the data field the resultant signal preceding the compared valu in the sequential order of data fields, to obtain the data fields of the resultant signal binary-cod base-(2n) values representing the combination the received binary-coded base-(2n) values.

18. The method of claim 17 wherein m equals fo and n equals five.

19. The method of claim 17 further comprising t steps of:

determining whether the step of summing yielded carry; and subtracting a value equal to $(2^m - 2n)$ from the val of the most-significant data field the resultant sigr if a carry is determined not to have been yielde 20. A method of operating a digital computer f combining two received digital signals, each having plurality of sequentially-ordered data fields each which includes m bits including a least-significant and a value defined by the bits representing a binar coded base-(2n) value, m and n being positive integers such that $2^m > 2n$, the method comprising the steps of:

binary values of the data fields of the same sequential order, to get a resultant signal defining a value representing the result of the subtracting and having a plurality of data fields ordered correspondingly to the data fields of the received signals and each including m bits including a least-significant bit;

comparing values of least-significant bits of data fields of the same sequential order of the received signals and the resultant signal; and for each comparison of least-significant bit values that include an odd number of ones, subtracting a value equal to $(2^m - 2n)$ from the value of the data field of the resultant signal preceding the compared values in the sequential order of data fields, to obtain in the data fields of the resultant signal binary-coded base-(2n) values representing the combination of the received binary-coded base-(2n) values.

21. The method of claim 20 wherein m equals four and n equals five.

22. The method of claim 20 further comprising the steps of:

determining whether the step of subtracting data field values yielded a carry; and subtracting a value equal to $(2^m - 2n)$ from the value of the most-significant data field of the resultant signal if a carry is determined to have been yielded.

23. A method of operating a digital computer to combine contents of two registers, each including a plurality of sequentially-ordered nibbles each having a plurality of bits including a least-significant bit, the values of the plurality of bits of each nibble together representing a binary-coded-decimal value, the method comprising the steps of:

exclusive-ORing the values of the least-significant bits of nibbles of the same order, to obtain in a third register a plurality of bits each having an exclusive-OR value corresponding with nibbles of a different order;

adding binary values represented by the bits of the two registers and a value comprising a plurality of sixes, one six for each nibble of one register, to obtain in the one register a resultant value represented by the bits of the one register;

comparing the values of the least-significant bits of nibbles of the one register each with the value of the corresponding bit of the third register; and for every comparison indicating equality, subtracting six from the value of the nibble of the one register preceding the compared values in the order, to obtain in the nibbles of the one register binary-coded-decimal values representing the sum of the binary-coded-decimal values initially held by the two registers.

24. The method of claim 23 further comprising the steps of:

determining whether the step of adding yielded a carry; and subtracting six from the value of the most-significant nibble of the one register if a carry is determined not to have been yielded.

25. A method of operating a digital computer to combine contents of two registers, each including a plurality of sequentially-ordered nibbles each having a plurality of bits including a least-significant bit, the values of the plurality of bits of each nibble together representing a binary-coded-decimal value, the method comprising the steps of:

exclusive-ORing the values of the least-significant bits of nibbles of the same order, to obtain in a third register a plurality of bits each having an exclusive-OR value corresponding with data fields of a different order;

subtracting binary values represented by the bits of the two registers, to obtain in one register a resultant value represented by the bits of the one register;

comparing the values of the least-significant bits of nibbles of the one register each with the value of the corresponding bit of the third register; and for every comparison indicating inequality, subtracting a six from the value of the nibble of the one register preceding the compared values in the order, to obtain in the nibbles of the one register binary-coded-decimal values representing the difference of the binary-coded-decimal values initially held by the two registers.

26. The method of claim 25 further comprising the steps of:

determining whether the step of subtracting the two registers' binary values yielded a carry; and subtracting six from the value of the most-significant nibble of the one register if a carry is determined to have been yielded.

27. An arrangement for generating object-program code from source-program code, comprising:

first means, responsive to receipt of source code specifying an operation on two binary-coded-decimal operands, for generating object code for obtaining two signals each representing a different one of the operands and each having a plurality of sequentially-ordered data fields each of which includes a plurality of bits, including a least-significant bit, defining a binary-coded-decimal value;

second means, cooperative with the first means, for generating object code for summing binary values of the data fields of the same sequential order and a value comprising a plurality of sixes, one six for data fields of the same sequential order, to get a resultant signal defining a value representing the result of the summing and having a plurality of data fields ordered correspondingly to the data fields of the obtained signals and each including a plurality of bits including a least-significant bit;

third means, cooperative with the first and the second means, for generating object code for examining values of least-significant bits of data fields of the same sequential order of the obtained signals and the resultant signal; and fourth means, cooperative with the third means, for generating object code for subtracting, for each examination of least-significant values that include an odd number of zeros, six from the value of the data field of the resultant signal preceding the compared values in the sequential order of data fields, to obtain a modified resultant signal;

whereby an object program comprising the object code generated by the first through fourth means yields the modified resultant signal defining binary-coded-decimal values representing the result of the operation on the two operands.

28. The arrangement of claim 27 further comprising:

fifth means, cooperative with the second means, for generating object code for determining whether execution of the summing object code yielded a carry; and sixth means, cooperative with the fifth means, for generating object code for subtracting six from the value of the most-significant data field of the resultant signal if a carry is determined not to have been yielded.

29. An arrangement for generating object-program code from source-program code, comprising:

first means, responsive to receipt of source code specifying an operation on two binary-coded-decimal operands, for generating object code for obtaining two signals each representing a different one of the operands and each having a plurality of sequentially-ordered data fields each of which includes a plurality of bits, including a least-significant bit, defining a binary-coded-decimal value;

second means, cooperative with the first means for generating object code for subtracting binary values of the data fields of the same sequential order, to get a resultant signal defining a value representing the result of the subtracting and having a plurality of data fields ordered correspondingly to the data fields of the obtained signals and each including a plurality of bits including a least-significant bit;

third means, cooperative with the first and the second means, for generating object code for examining values of least-significant bits of data fields of the same sequential order of the obtained signals and the resultant signal; and fourth means, cooperative with the third means, for generating object code for subtracting, for each examination of least-significant bit values that include an odd number of ones, six from the value of the data field of the resultant signal preceding the compared values in the sequential order of data fields, to obtain a modified resultant signal;

whereby an object program comprising the object code generated by the first through fourth means yields the modified resultant signal defining binary-code-decimal values representing the result of the operation on the two operands.

30. The arrangement of claim 29 further comprising:

fifth means, cooperative with the second means, for generating object code for determining whether execution of the object code for subtracting data field values yielded a carry; and sixth means, cooperative with the fifth means, for generating object code for subtracting six from the value of the most-significant data field of the resultant signal if a carry is determined to have been yielded.

31. An arrangement for generating object-program code from source-program code, comprising:

first means, responsive to receipt of source code specifying addition of two binary-coded-decimal operands, for identifying two registers each having contents representing a different one of the operands and each including a plurality of sequentially-ordered nibbles each having a plurality of bits including a least-significant bit, the values of the plurality of bits of each nibble together representing a binary-coded-decimal value;

second means, cooperative with the first means, for generating object code for exclusive-ORing the values of least-significant bits of nibbles of the same order, to obtain in a third register a plurality of bits each having an exclusive-OR value corresponding with nibbles of a different order;

third means, cooperative with the first means, for generating object code for adding binary values represented by the bits of the two registers and a value comprising a plurality of sixes, one six for each nibble of one register, to obtain in the one register a resultant value represented by the bits of the one register;

forth means, cooperative with the first and the second means, for generating object code for comparing the values of the least-significant bits of nibbles of the one register each with the value of the corresponding bit of the third register; and fifth means, cooperative with the fourth means, for generating object code for subtracting, for every comparison indicating equality, six from the value of the nibble of the one register preceding the compared values in the order;

whereby an object program comprising the object code generated by the first through fifth means is for obtaining in the nibbles of the one register binary-coded-decimal values representing the sum of the binary-coded-decimal values initially held by the two registers.

32. The arrangement of claim 31 further comprising sixth means, cooperative with the third means, for generating object code for determining whether execution of the code for adding yielded a carry and seventh means, cooperative with the sixth means, for generating object code for subtracting six from the value of the most-significant nibble of the one register if a carry is determined not to have been yielded.

33. An arrangement for generating object-program code from source-program code, comprising:

first means, responsive to receipt of source code specifying subtraction of two binary-coded-decimal operands, for identifying two registers each having contents representing a different one of the operands and each including a plurality of sequentially ordered nibbles each having a plurality of bits including a least-significant bit, the values of the plurality of bits of each nibble together representing a binary-coded-decimal value;

second means, cooperative with the first means, for generating object code for exclusive-ORing the values of least-significant bits of nibbles of the same order, to obtain in a third register a plurality of bits each having an exclusive-OR value corresponding with nibbles of a different order;

third means, cooperative with the first means, for generating object code for subtracting binary values represented by the bits of the two registers, to obtain in the one register a resultant value represented by the bits of the one register;

fourth means, cooperative with the first and the second means, for generating object code for comparing the values of the least-significant bits of nibbles of the one register each with the value of the corresponding bit of the third register; and fifth means, cooperative with the fourth means, for generating object code for subtracting, for every comparison indicating inequality, six from the value of the nibble of the one register preceding the compared values in the order;

whereby an object program comprising the object code generated by the first through fifth means is for obtaining in the nibbles of the one register binary-coded-decimal values representing the difference of the binary-coded-decimal values initially held by the two registers.

34. The arrangement of claim 33 further comprising:

sixth means, cooperative with the third means, for generating object code for determining whether execution of the code for subtracting the two registers' binary values yielded a carry; and seventh means, cooperative with the sixth means, for generating object code for subtracting six from the value of the most-significant nibble of the one register if a carry is determined to have been yielded.

35. A system for allocating a resource to a resource user, comprising:

first means, for representing two portions of the resource each by a different signal, each signal having a plurality of sequentially-ordered data fields each of which includes a plurality of bits, including a least-significant bit, defining a binary-coded-decimal value;

second means, cooperative with the first means, for summing binary values of the data fields of the same sequential order and a value comprising a plurality of sixes, one six for data fields of the same sequential order, to get a resultant signal defining a value representing the the result of the summing and having a plurality of data fields ordered correspondingly to the data fields of the representing signals and each including a plurality of bits including a least-significant bit;

third means, cooperative with the first and second means for examining values of least-significant bits of data fields of the same sequential order of the representing signals and the resultant signal;

fourth means, cooperative with the third means, for subtracting, for each examination of least-significant bit values that include an odd number of zeros, six from the value of the data field of the resultant signal preceding the compared values in the sequential order of data fields, to obtain a modified resultant signal; and fifth means, cooperative with the fourth means, for allocating to the user a portion of the resource represented by binary-coded-decimal values defined by the modified resultant signal.

36. The system of claim 35 further comprising:

sixth means, cooperative with the second means, for determining whether the summing performed by the second means yielded a carry; and seventh means, cooperative with the sixth means, for subtracting six from the value of the most-significant data field of the resultant signal, if a carry is determined not to have been yielded.

37. A system for allocating a resource to a resource user, comprising:

first means, for representing two portions of the resource each by a different signal, each signal having a plurality of sequentially-ordered data fields each of which includes a plurality of bits, including a least significant bit, defining a binary-coded-decimal value;

second means, cooperative with the first means, for subtracting binary values of the data fields of the same sequential order, to get a resultant signal defining a value representing the the result of the subtracting and having a plurality of data fields ordered correspondingly to the data fields of the representing signals and each including a plurality of bits including a least-significant bit;

third means, cooperative with the first and second means, for examining values of least-significant bits of data fields of the same sequential order of the representing signals and the resultant signal;

fourth means, cooperative with the third means, for subtracting, for each examination of least-significant bit values that include an odd number of ones, six from the value of the data field of the resultant signal preceding the compared values in the sequential order of data fields, to obtain a modified resultant signal; and fifth means, cooperative with the fourth means, for allocating to the user a portion of the resource represented by binary-coded-decimal values defined by the modified resultant signal.

38. The system of claim 37 further comprising:

sixth means, cooperative with the second means, for determining whether the subtracting performed by the second means yielded a carry; and seventh means, cooperative with the sixth means, for subtracting six from the value of the most-significant data field of the resultant signal, if a carry is determined to have been yielded.

39. A system for allocating a resource to a resource user, comprising:

three registers;

first means, for representing two portions of the resource each by contents of a different register, each register including a plurality of sequentially-ordered nibbles each having a plurality of bits, including a least significant bit, defining a binary-coded-decimal value;

second means, cooperative with the first means, for exclusive-ORing the values of the least-significant bits of nibbles of the same order, to obtain in a third register a plurality of bits each having an exclusive-OR value cor sponding with nibbles of a different order;

third means, cooperative with the first means, for adding binary values represented by the bits of the two registers and a value comprising a plurality of sixes, one six for each nibble of one register, to obtain in the one register a resultant value represented by the bits of the one register;

fourth means, cooperative with the first and second means, for comparing the values of the least-significant bits of nibbles of the one register each with the value of the corresponding bit of the third register;

fifth means, cooperative with the fourth means, for subtracting, for every comparison indicating equality, six from the value of the nibble of the one register preceding the compared values in the order; and sixth means, cooperative with the fifth means, for allocating to the user a portion of the resource represented by binary-coded-decimal values contained in the one register.

40. The system of claim 39 further comprising:

seventh means, cooperative with the third means, for determining whether the adding performed by the third means yielded a carry; and eighth means, cooperative with the seventh means, for subtracting six from the value of the mostsignificant nibble of the one register, if a carry is determined not to have been yielded.

41. A system for allocating a resource to a resource user, comprising:

three registers;

first means, for representing two portions of the resource each by contents of a different register, each register including a plurality of sequentiallyordered nibbles each having a plurality of bits, including a least significant bit, defining a binary-coded-decimal value;

second means, cooperative with the first means, for exclusive-ORing the values of the least-significant bits of nibbles of the same order, to obtain in a third register a plurality of bits each having an exclusive-OR value corresponding with nibbles of a different order;

third means, cooperative with the first means, for subtracting binary values represented by the bits of the two registers, to obtain in the one register a resultant value represented by the bits of the one register;

fourth means, cooperative with the first and second means, for comparing the values of the leastsignificant bits of nibbles of the one register each with the value of the corresponding bit of the third register;

fifth means, cooperative with the fourth means, for subtracting, for every comparison indicating inequality, six from the value of the nibble of the one register preceding the compared values in the order; and sixth means, cooperative with the fifth means, for allocating to the user a portion of the resource represented by binary-coded-decimal values contained in the one register.

42. The system of claim 41 further comprising:

seventh means, cooperative with the third means, for determining whether the subtracting performed by the third means yielded a carry; and eighth means, cooperative with the seventh means subtracting six from the value of the most-significant nibble of the one register, if a carry is determined to have been yielded.

43. A digital computer arranged for combining two signals, comprising:

a plurality of means for representing signals, each of the two signals being represented by different signal-representing means, each of the two signals' representing means having a plurality of sequentially-ordered data fields each of which includes m bits including a least-significant bit and a value defined by the bits representing a binary-coded base-(2n) value, m and n being positive integers such that $2^m > 2n$;

means, cooperative with the signal-representing means, for summing binary values of the data fields of the same sequential order of the two signals' representing means and a plurality of values each equal to $(2^m > 2n)$, one value for data fields of the same sequential order, to obtain a resultant signal represented by one of the plurality of signal-representing means, the resultant signal-representing means defining a value representing the result of the summing and having a plurality of data fields ordered correspondingly to data fields of the two signals' representing means and each including m bits including a least-significant bit;

means, cooperative with the signal-representing means, for comparing values of least-significant bits of data fields of the same sequential order of the two signals' representing means and the resultant signal-representing means; and means, cooperative with the comparing means and the signal-representing means, for subtracting, for each comparison of least-significant bit values that include an odd number of zeros, a value equal to $(2^m - 2n)$ from the value of the data field of the resultant signal-representing means preceding the compared values in the sequential order of data fields, to obtain in the data fields of the resultant signal-representing means binary-coded base-(2n) values representing the combination of the binary-coded (2n) values initially represented by the two signals' representing means.

44. The computer of claim 43 wherein m equals four and n equals five.

45. The computer of claim 43 further comprising:

means, cooperative with the summing means, for determining whether the summing yielded a carry; and means, cooperative with the determining means and the signal-representing means, for subtracting a value equal to $(2^m - 2n)$ from the value of the most-significant data field resultant signal-representing means, if a carry is determined not to have been yielded.

46. A digital computer arranged for combining two signals, comprising:

a plurality of means for representing signals, each of the two signals being represented by different signal-representing means, each of the two signals' representing means having a plurality of sequentially-ordered data fields each of which includes m bits including a least-significant bit and a value defined by the bits representing a binary-coded base-(2n) value, m and n being positive integers such that $2^m > 2n$;

means, cooperative with the signal-representing means, for subtracting binary values of the data fields of the same sequential order of the two signals' representing means, to obtain a resultant signal represented by one of the plurality of signal-representing means, the resultant signal-representing means defining a value representing the result of the subtracting and having a plurality of data fields ordered correspondingly to data fields of the two signals' representing means and each including m bits including a least-significant bit;

means, cooperative with the signal-representing means, for comparing values of least-significant bits of data fields of the same sequential order of the two signals' representing means and the resultant signal-representing means; and means, cooperative with the comparing means and the signal-representing means, for subtracting, for each comparison of least-significant bit values including an odd number of ones, a value equal to $(2^m - 2N)$ from the value of the data field of the resultant signal-representing means preceding the compared values in the sequential order of data fields, to obtain in the data fields of the resultant signal-representing means binary-coded base-(2n) values representing the combination of the binary coded base-(2n) values initially represented by the two signals' representing means.

47. The computer of claim 46 wherein m equals four and n equals five.

48. The computer of claim 46 further comprising:

means, cooperative with the data field binary value subtracting means, for determining whether the subtracting of data field values yielded a carry; and means, cooperative with the determining means and signal-representing means, for subtracting a value equal to $(2^m-2n)$ from the value of the most-significant data field resultant signal-representing means, if a carry is determined to have been yielded.

49. A programmed digital computer comprising:

a first and a second register, each including a plurality of sequentially-ordered nibbles each having a plurality of bits including a least-significant bit, the values of the plurality of bits of each nibble together representing a binary-coded-decimal value;

a third register;

means, cooperative with the three registers, for exclusive-ORing the values of the least-significant bits of nibbles of the same order of the first and the second register, to obtain in the third register a plurality of bits each having an exclusive-OR value corresponding with nibbles of a different order;

means, cooperative with the first and the second register, for adding binary values represented by the bits of the two registers and a value comprising a plurality of sixes, one six for each nibble of one register, to obtain in the first register a resultant value represented by the bits of the first register;

means, cooperative with the first and the third register, for comparing the values of the least-significant bits of nibbles of the first register each with the value of the corresponding bit of the third register; and means, cooperative with the comparing means and with the first register, for subtracting, for every comparison indicating equality, six from the value of the nibble of the first register preceding the compared values in the order, to obtain in the nibbles of the first register binary-coded-decimal values representing the sum of the binary-coded-decimal values initially held by the first and the second register.

50. The computer of claim 49 further comprising:

means, cooperative with the adding means, for determining whether the addition yielded a carry; and means, cooperative with the first register and with determining means, for subtracting six from the value of the most-significant nibble of the first register if a carry is determined not to have been yielded.

51. A programmed digital computer comprising:

a first and a second register, each including a plurality of sequentially-ordered nibbles each having a plurality of bits including a least-significant bit, the values of the plurality of bits of each nibble together representing a binary-coded-decimal value;

a third register;

means, cooperative with the three registers, for exclusive-ORing the values of the least-significant bits of nibbles of the same order of the first and the second register, to obtain in the third register a plurality of bits each having an exclusive-OR value corresponding with nibbles of a different order;

means, cooperative with the first and the second register, for subtracting binary values represented by the bits of the two registers, to obtain in the first register a resultant value represented by the bits of the first register;

means, cooperative with the first and the third register, for comparing the values of the least-significant bits of nibbles of the first register each with the value of the corresponding bit of the third register; and means, cooperative with the comparing means and with the first register, for subtracting, for every comparison indicating inequality, six from the value of the nibble of the first register preceding the compared values in the order, to obtain in the nibbles of the first register binary-coded-decimal values representing the difference of the binary-coded-decimal values initially held by the first and the second registers.

52. The computer of claim 51 further comprising:

means, cooperative with the register binary value subtracting means, for determining whether the subtraction yielded a carry; and means, cooperative with the first register and with the determining means, for subtracting six from the value of the most-significant nibble of the first register if a carry is determined have been yielded.

• • • • •